US012725969B2

(12) United States Patent
Zeng et al.

(10) Patent No.: US 12,725,969 B2
(45) Date of Patent: Sep. 1, 2026

(54) CONNECTOR ASSEMBLY WITH MATING PROCESS

(71) Applicant: Molex, LLC, Lisle, IL (US)

(72) Inventors: Ning Zeng, Jurong Town (SG); Kai Murakami, Yamato (JP); Kimiyasu Makino, Yamato (JP); Hidehiro Matsushita, Yamato (JP)

(73) Assignee: Molex, LLC, Lisle, IL (US)

( * ) Notice: Subject to any disclaimer, the term of this patent is extended or adjusted under 35 U.S.C. 154(b) by 315 days.

(21) Appl. No.: 18/216,617

(22) Filed: Jun. 30, 2023

(65) Prior Publication Data

US 2023/0411904 A1 Dec. 21, 2023

(30) Foreign Application Priority Data

Jun. 16, 2022 (CN) ........................ 202210686325.4

(51) Int. Cl.
*H01R 13/627* (2006.01)
*H01R 13/506* (2006.01)
*H01R 13/639* (2006.01)

(52) U.S. Cl.
CPC ....... *H01R 13/6272* (2013.01); *H01R 13/506* (2013.01); *H01R 13/639* (2013.01)

(58) Field of Classification Search
CPC .................................................... H01R 13/639
See application file for complete search history.

(56) References Cited

U.S. PATENT DOCUMENTS 5,482,471 A 1/1996 Mori et al.
7,172,450 B1 2/2007 Sylvia et al.
7,927,122 B2 * 4/2011 Yamaji ................. H01R 9/0515 439/376
11,251,550 B1 2/2022 Davidsz
11,769,966 B2 * 9/2023 Hsiao ................... H01R 13/639 439/78
2007/0004266 A1 * 1/2007 Tang .................... H01R 12/716 439/372
2013/0343711 A1 * 12/2013 Sano ...................... G02B 6/428 385/88
2021/0126404 A1 * 4/2021 Laurx ................ H01R 13/6471
2022/0263273 A1 * 8/2022 Murakami ......... H01R 13/6471

FOREIGN PATENT DOCUMENTS

| | | | |
|---|---|---|---|
| CN | 203481583 | U | 3/2014 |
| JP | 3743305 | B2 | 11/2005 |
| JP | 2016149212 | A | 8/2016 |
| TW | 201110477 | A | 3/2011 |
| TW | 201601390 | A | 1/2016 |

* cited by examiner

*Primary Examiner* — Oscar C Jimenez

(57) ABSTRACT

A connector assembly includes a first connector and a second connector. The first connector includes a first housing and a first terminal held by the first housing, the first terminal has a first contact portion which extends in a first direction. The second connector includes a second housing and a second terminal held by the second housing, the second terminal extends in the first direction and has a second contact portion. In a mating process of the first connector and the second connector, the first connector and the second connector firstly move toward each other along the first direction, then move along a second direction perpendicular to the first direction relative to each other to make the first contact portion of the first terminal contact the second contact portion of the second terminal and make the first connector and the second connector mate with each other.

20 Claims, 20 Drawing Sheets

CONNECTOR ASSEMBLY WITH MATING PROCESS

RELATED APPLICATION

The present application claims priority to Chinese patent Application No. 202210686325.4 filed on Jun. 16, 2022, which is incorporated by reference in its entirety.

TECHNICAL FIELD

The present disclosure relates to a connector, and particularly relates to a connector assembly.

BACKGROUND

United States Utility patent U.S. Pat. No. 7,172,450 B1 discloses a socket for use in testing packaged integrated circuits, the socket has a handle which is capable of moving between an open position and a closed position, when the handle is in the open position, the socket is capable of receiving or discharging the packaged integrated circuits; when the handle is in the closed position, the socket is capable of preventing the packaged integrated circuits from being detached therefrom. However, there are still much room for improvement on the cooperation structure between the socket and the packaged integrated circuits.

SUMMARY

Therefore, an object of the present disclosure is to provide a connector assembly which has at least one improvement in comparison with the prior art.

Accordingly, in some embodiments, a connector assembly of the present disclosure comprises a first connector and a second connector. The first connector comprises a first housing and a first terminal held by the first housing, the first terminal has a first contact portion which extends in a first direction. The second connector comprises a second housing and a second terminal held by the second housing, the second terminal extends in the first direction and has a second contact portion. In a mating process of the first connector and the second connector, the first connector and the second connector firstly move toward each other along the first direction, then move along a second direction perpendicular to the first direction relative to each other to make the first contact portion of the first terminal contact the second contact portion of the second terminal and make the first connector and the second connector mate with each other.

In some embodiments, the first connector further comprises a cable held by the first housing, the first terminal further has a first connecting portion connected to the cable; the second connector is mounted on a surface of a circuit board.

In some embodiments, the first connector comprises a plurality of first terminals, the plurality of first terminals comprises a first signal terminal, the second connector comprises a plurality of second terminals, the plurality of second terminals comprises a second signal terminal which is used to mate with the first signal terminal, when the first connector mates with the second connector, the second contact portion of the second signal terminal of the second terminal is toward and abuts against a surface of the first contact portion of the first signal terminal of the first terminal.

In some embodiments, the second contact portion of the second signal terminal of the second terminal is constructed to an edge of the second signal terminal, when the first connector mates with the second connector, the second contact portion of the second signal terminal points to the first contact portion of the first signal terminal.

In some embodiments, the second contact portion of the second signal terminal is constructed to an arc-shaped edge of the second signal terminal.

In some embodiments, the plurality of first terminals further comprises a first grounding terminal, the plurality of second terminals further comprises a second grounding terminal which is used to mate with the first grounding terminal.

In some embodiments, the first connector further comprises a cable and a grounding piece which are held by the first housing, the cable has a signal wire and a ground wire, the signal wire is connected to the first signal terminal of the first terminal, the grounding piece is connected between the first grounding terminal of the first terminal and the ground wire of the cable.

In some embodiments, the first grounding terminal of the first terminal is formed by bending a conductive metal plate and is a U-shaped construction.

In some embodiments, the second terminal further has a second connecting portion which is connected to the circuit board.

In some embodiments, the first connector further comprises a cable which is held by the first housing, the first housing comprises a first body and a covering structure, the first body has a terminal receiving space and a cable receiving space, the first terminal and a local part of the cable are provided to the terminal receiving space, a local part of the cable is provided to the cable receiving space, the covering structure is provided to the cable receiving space of the first body by overmolding.

In some embodiments, the first connector further comprises a cable which is held by the first housing, the first housing comprises a first body and a full covering structure, the first body has a terminal receiving space and a cable receiving space, the first terminal and a local part of the cable are provided to the terminal receiving space, a local part of the cable is provided to the cable receiving space, the full covering structure is provided to the terminal receiving space and the cable receiving space of the first body by overmolding.

In some embodiments, the first connector further comprises a first shell which covers around at least a part of the first housing, the second connector further comprises a second shell which covers around at least a part of the second housing and an actuator which is rotatably provided to the second shell, the actuator is capable of rotating between a non-actuating position and an actuating position relative to the second shell, when the actuator is in the non-actuating position, the first connector and the second connector are capable of moving toward each other along the first direction; when the actuator rotates from the non-actuating position to the actuating position, the actuator pushes the first connector in the second direction to make the first contact portion of the first terminal contact the second contact portion of the second terminal and make the first connector and the second connector mate with each other.

In some embodiments, the first shell has two first side portions which respectively cover two sides of the first housing in a third direction perpendicular to the first direction and the second direction and a top portion which is connected between the two first side portions, the second shell has two second side portions which cover respectively two sides of the second housing in the third direction, the actuator is rotatably provided to the two second side portions of the second shell.

In some embodiments, the actuator has a pivoting structure which is pivoted to the second shell, the pivoting structure has a cam portion, when the actuator rotates from the non-actuating position to the actuating position, the cam portion of the actuator pushes the first connector in the second direction to make the first contact portion of the first terminal contact the second contact portion of the second terminal and make the first connector and the second connector mate with each other.

In some embodiments, the actuator has a restoring structure, when the actuator rotates from the actuating position to the non-actuating position, the restoring structure of the actuator pushes the first connector in the second direction to make the contacting between the first contact portion of the first terminal and the second contact portion of the second terminal released and the mating of the first connector and the second connector released.

In some embodiments, the actuator has a locking arm, when the actuator rotates from the non-actuating position to the actuating position, the locking arm engages with and is locked to the second shell.

In some embodiments, the first connector has a locking hook portion, the second connector has a locking block and a locking recessed groove which are adjacent to each other, when the first connector and the second connector move relative to each other along the second direction and mate with each other, the locking hook portion hooks to the locking block along the second direction, and a tail end of the locking hook portion inserts into the locking recessed groove along the second direction.

In some embodiments, the first connector has a locking protruding portion, the second connector has a locking hole, when the first connector and the second connector move relative to each other along the second direction and mate with each other, the locking protruding portion snaps into the locking hole along the second direction.

The mating process between the first connector and the second connector of the connector assembly of the present disclosure may be divided into the former half and the latter half, in the former half, the first connector and the second connector move toward each other along the first direction; in the latter half, the first connector and the second connector move relative to each other along the second direction) Because only in the latter half of the mating process can the first terminal of the first connector and the second terminal of the second connector contact each other, so in the former half of the mating process, a contact force between the first terminal of the first connector and the second terminal of the second connector is zero. In addition, the cam portion of the actuator can push the first connector in the second direction to make the first connector and the second connector mate with each other, the restoring structure of the actuator can push the first connector 1 in the second direction to make the mating between the first connector 1 and the second connector released, the locking arm of the actuator can make the actuator held to the actuating position. Moreover, the second contact portion of the second signal terminal of the second terminal of the second connector is constructed to the arc-shaped edge of the second signal terminal and is used to abut against the surface of the first contact portion of the first signal terminal of the first terminal, such a contacting manner can increase a contact pressure between the second contact portion and the surface of the first contact portion, and, a contact area between the second contact portion which is constructed to the arc-shaped edge of the second signal terminal and the surface of the first contact portion of the first signal terminal is more stable in size, which can avoid a problem that a contact area with respect to a straight line shaped edge structure is not stable in size (a line-shaped contact region between terminals is prone to be converted into a point-shaped contact region due to rotating of the terminal(s)). Moreover, a stress on the cable can be relieved by the covering structure which is provided to the cable receiving space of the first body and only covers the local part of the cable, by the cooperation between the locking hook portion and the locking block and the locking recessed groove and the cooperation between the locking protruding portion and the locking hole, an effect that the first connector and the second connector can be locked after the first connector and the second connector mate with each other.

BRIEF DESCRIPTION OF THE DRAWINGS

Other features and effects of the present disclosure will be apparent from embodiments referring to the drawings, in which.

DETAILED DESCRIPTION OF THE PREFERRED EMBODIMENTS

Figure 1:
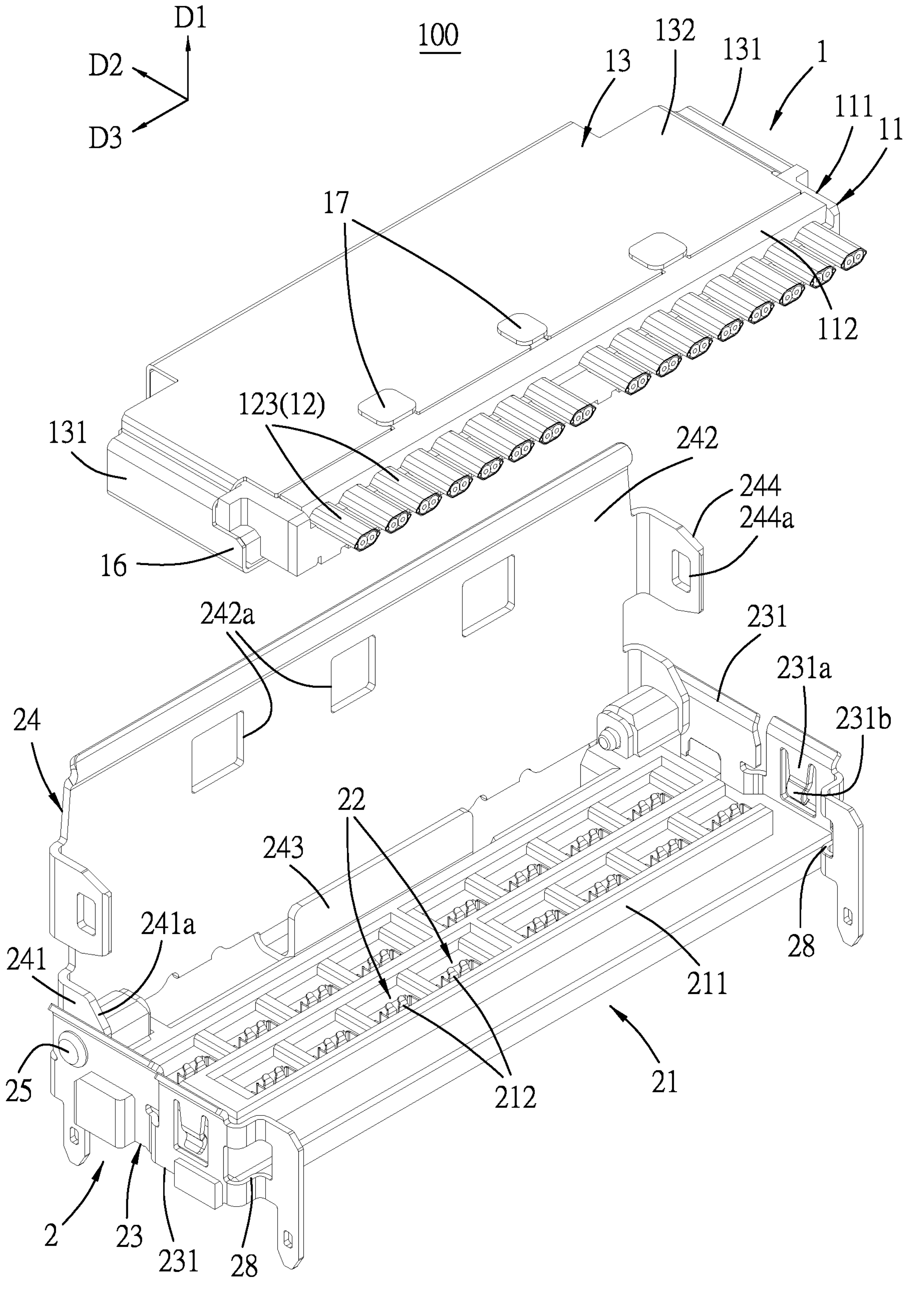
FIG. 1 is a perspective view of an embodiment of a connector assembly of the present disclosure, in which a first connector and a second connector of the embodiment do not mate with each other and are spaced apart from each other along an up-down direction.
Figure 2:
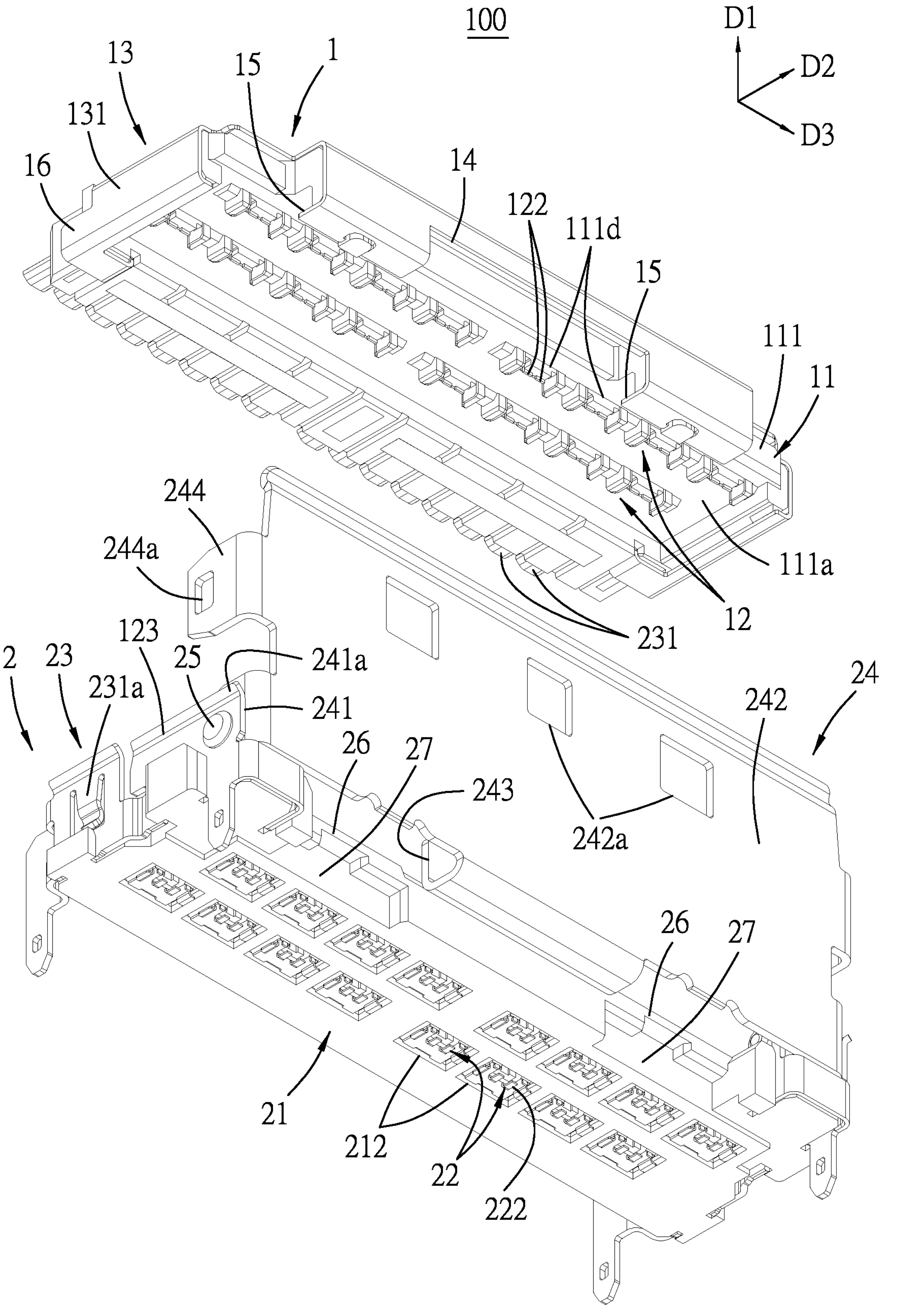
FIG. 2 is another perspective view of the embodiment of FIG. 1, in which the first connector and the second connector of the embodiment do not mate with each other and are spaced apart from each other along the up-down direction.

Referring to FIG. 1 and FIG. 2, an embodiment of a connector assembly 100 of the present disclosure includes a first connector 1 and a second connector 2.

Referring to FIG. 1 to FIG. 5, the first connector 1 includes a first housing 11 made of an insulative material, a plurality of first terminal modules 12 which are held by the first housing 11, and a first shell 13 which covers around at least a part of the first housing 11.

The first housing 11 includes a first body 111 and a covering structure 112. The first body 111 has a first mating portion 111*a* which is toward the down along an up-down direction D1 (a first direction to which an arrow points is up, and an opposite direction is down), and a terminal receiving space 111*b* and a cable receiving space 111*c* which are formed to be arranged front and rear along a front-rear direction D2 (a second direction to which an arrow points is front, and an opposite direction is rear) and are opened upwardly. The terminal receiving space **1*l*1***b* and the cable receiving space **1*l*1c for example each are provided as two in number, the two terminal receiving spaces 111***b* are arranged along a left-right direction D3 (a third direction to which an arrow points is right, and an opposite direction is left), the two cable receiving spaces 111*c* respectively extend rearwardly from rear ends of the two terminal receiving spaces 111*b*. Each terminal receiving space 111*b* has a plurality of terminal receiving holes 111*d* which extend downwardly to the first mating portion 111*a*.

Each first terminal module 12 includes a terminal holding structure 121 which extends along the left-right direction D3, a plurality of first terminals 122 which are held by the terminal holding structure 121, a plurality of cables 123 which are held by the terminal holding structure 121, and a grounding piece 124 which is held by the terminal holding structure 121. The plurality of first terminals 122 includes a plurality of first signal terminals 122*a* and a plurality of first grounding terminals 122*b*. The first grounding terminal 122*b* of the first plurality of terminals 122 is formed by bending a conductive metal plate and has an inverted U-shaped construction, each first signal terminal 122*a* has a first contact portion 122*c* which extends downwardly in the up-down direction D1 and a first connecting portion 122*d* which is positioned at a top portion of the first signal terminal 122*a*, each first grounding terminal 122*b* has two first contact portions 122*e* which are positioned at a left side and a right side of the first grounding terminal 122*b* respectively and extend downwardly in the up-down direction D1 and two first connecting portions 122*f* which are positioned at the left side and the right side of the first grounding terminal 122*b* respectively and are relatively positioned above the two first contact portions 122*e* respectively. The plurality of first terminals 122 are divided into four first terminal sets 125, and the four first terminal sets 125 are arranged as one row along the left-right direction D3, each first terminal set 125 is constituted by the two first signal terminals 122*a* which are arranged side by side left and right and one first grounding terminal 122*b*; in each first terminal set 125, the first grounding terminal 122*b* shields the two first signal terminals 122*a*, and the two first contact portions 122*e* of the first grounding terminal 122*b* are substantially positioned at a left side and a right side of the first contact portions 122*c* of the two first signal terminals 122*a* respectively, the two first connecting portions 122*f* of the first grounding terminal 122*b* are substantially positioned at a left side and a right side of the first connecting portions 122*d* of the two first signal terminals 122*a*.

The plurality of cables 123 respectively correspond to the first terminal sets 125. Each cable 123 has two signal wires 123*a* which are connected to the first connecting portions 122*d* of the two first signal terminals 122*a* of the corresponding first terminal set 125 and two ground wires 123*b* which are connected to the grounding piece 124, and the grounding piece 124 abuts against the first connecting portions 122*f* of the first grounding terminals 122*b* of the first terminal sets 125 of the row, that is to say, the grounding piece 124 is connected between the plurality of first grounding terminals 122*b* of the plurality of first terminals 122 and the ground wires 123*b* of the plurality of cables 123, the first connecting portion 122*f* of the first grounding terminal 122*b* is indirectly connected to the ground wire 123*b* of the corresponding cable 123 via the grounding piece 124. The terminal holding structure 121 at least partially surrounds and holds the first terminal sets 125 of the corresponding row and locations where the first terminal sets 125, the plurality of cables 123 and the grounding piece 124 are connected, for example, the terminal holding structure 121 may be formed over the first terminal sets 125, local parts of the plurality of cables 123 and the grounding piece 124 by insert molding.

The first terminal module 12 is provided to the first body 111 of the first housing 11. Specifically, the first terminal sets 125 (the plurality of first terminals 122), local parts of front segments of the plurality of cables 123 and the grounding piece 124 together with the terminal holding structure 121 are provided to the terminal receiving space 111*b* of the first body 111 of the first housing 11, local parts of rear segments of the plurality of cables 123 are provided to the cable receiving space 111*c* of the first body 111 of the first housing 11, and the first contact portions 122*c*, 122*e* of the plurality of first terminals 122 together with local parts of the corresponding terminal holding structure 121 are exposed to the first mating portion 111*a* respectively via the terminal receiving holes 111*d*.

Figure 3:
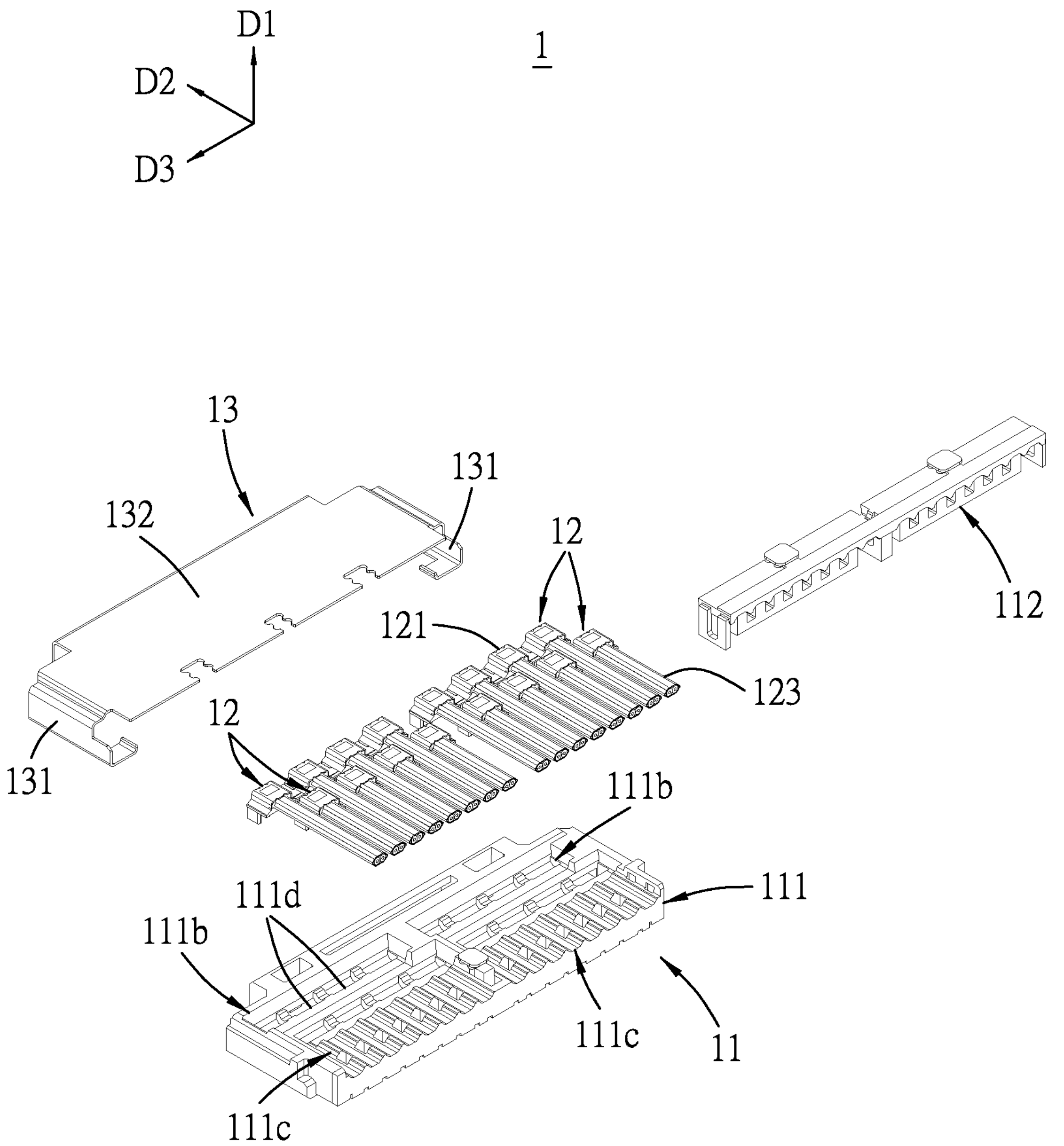
FIG. 3 is an exploded perspective view of the first connector of the embodiment.
Figure 4:
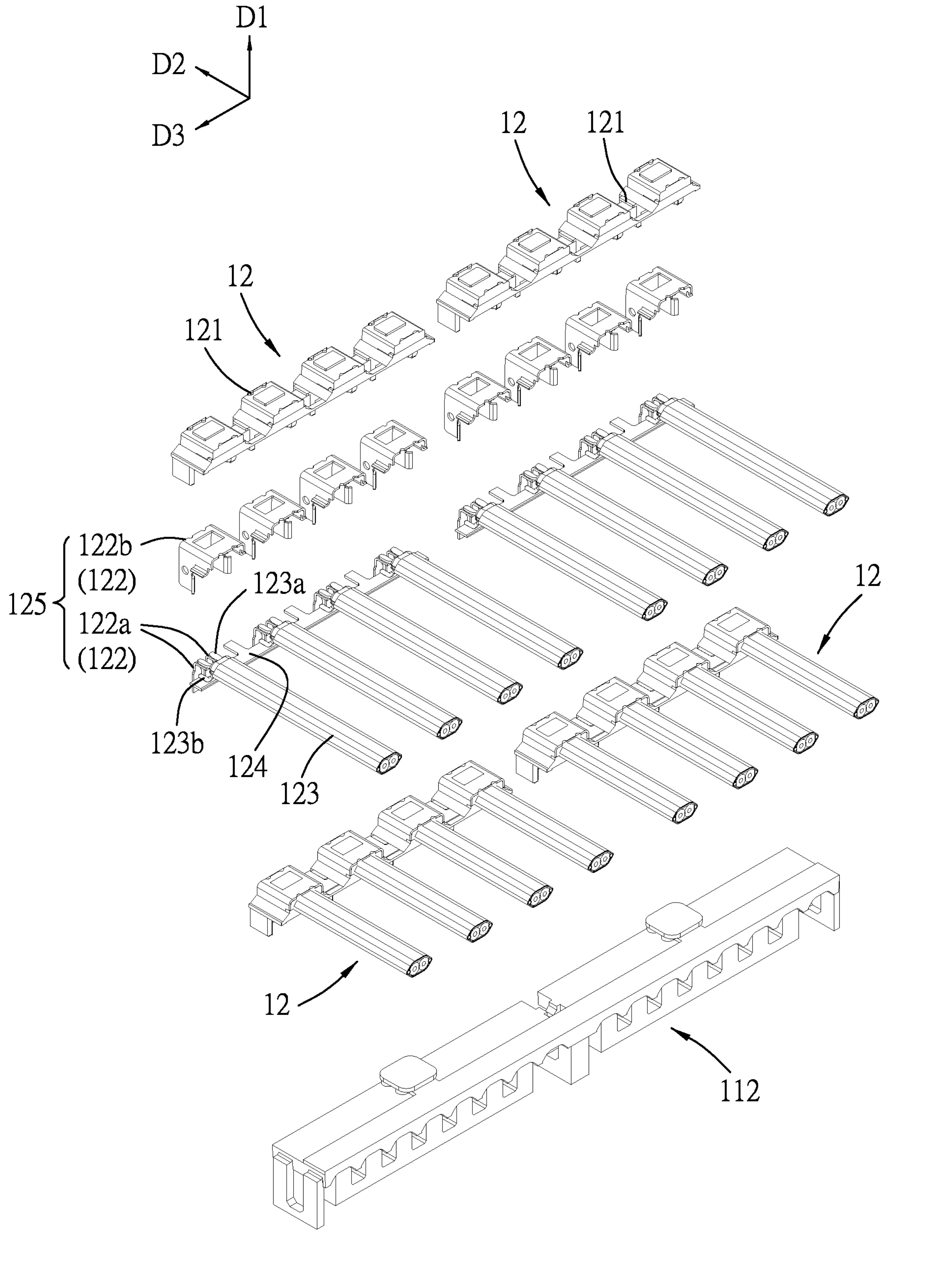
FIG. 4 is an exploded perspective view of a first terminal module and a covering structure of the first connector of the embodiment.
Figure 6:
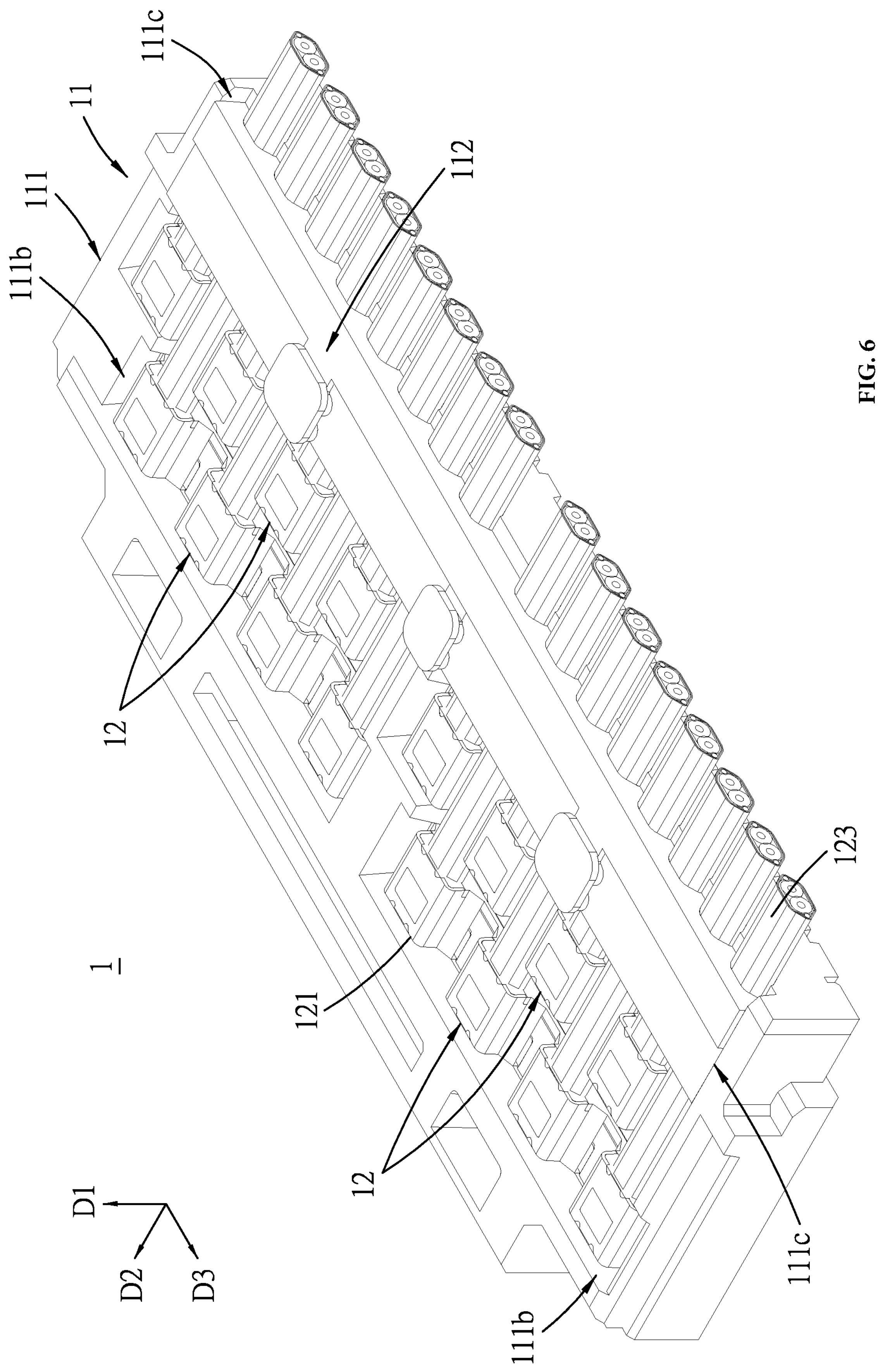
FIG. 6 is a perspective view of the first connector of the embodiment, in which a first shell of the first connector of the embodiment is omitted.
Figure 7:
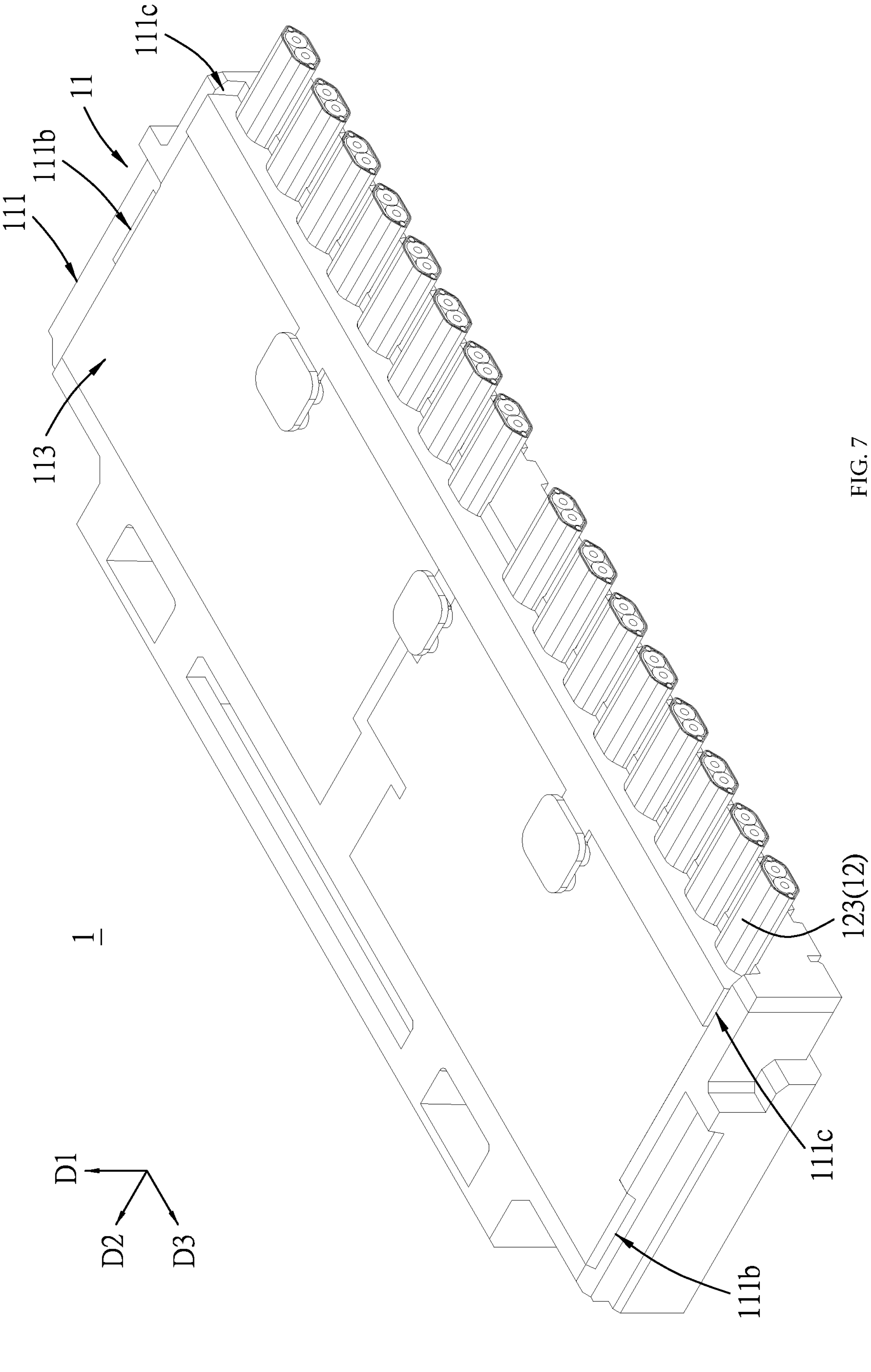
FIG. 7 is a perspective view of a first connector of a varied embodiment, in which a first shell of the first connector of the varied embodiment is omitted.
Figure 8:
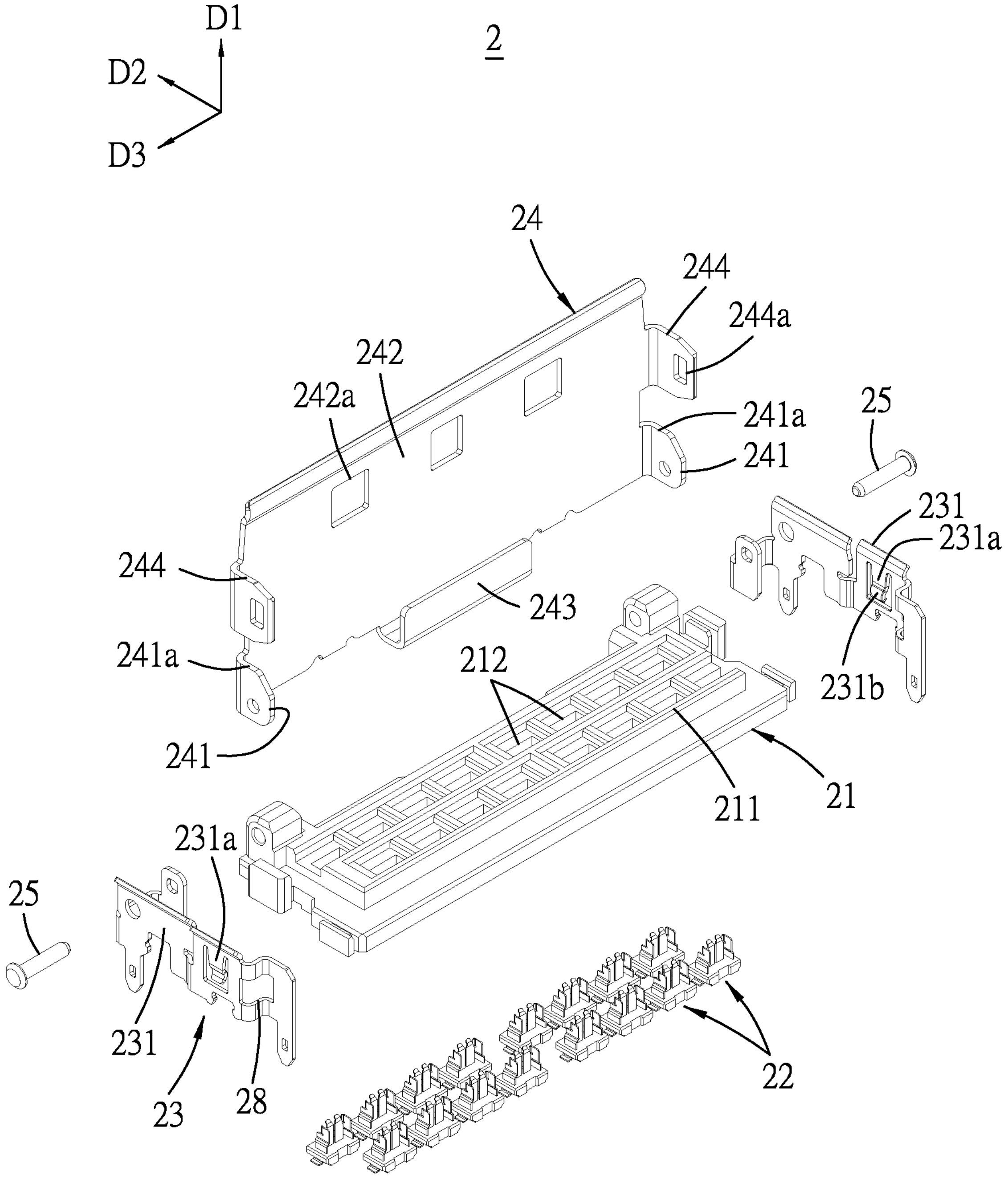
FIG. 8 is an exploded perspective view of the second connector of the embodiment.

Referring to FIG. 3 and FIG. 6, the covering structure 112 of the first housing 11 is provided to the cable receiving space 111*c* of the first body 111 by filing under overmolding. Specifically, the covering structure 112 covers the local parts of the rear segments of the cables 123, a stress on the cable 123 can be relieved by the covering structure 112 which is provided to the cable receiving space 111*c* of the first body 111 and only covers the local part of the cable 123. Referring to FIG. 6 and FIG. 7, it is noted that, in a varied embodiment, the covering structure 112 may be replaced by a full covering structure 113, the full covering structure 113 is provided to the terminal receiving space 111*b* and the cable receiving space 111*c* of the first body 111 by filing under overmolding, the full covering structure 113 covers parts of the plurality of first terminal modules 12 which are positioned in the terminal receiving space 111*b* and the cable receiving space 111*c* of the first body 111.

Referring to FIG. 1 to FIG. 3, the first shell 13 is formed for example by bending a metal plate. The first shell 13 has two first side portions 131 which respectively cover a left side and a right side of the first housing 11 in the left-right direction D3 and a top portion 132 which is connected between the two first side portions 131, the top portion 132 covers the first body 111 in the up-down direction D1 and covers the terminal receiving space **1*l*1*b* and the cable receiving space 111***c* of the first body 111.

Referring to FIG. 1 to FIG. 2 and FIG. 8 to FIG. 10, the second connector 2 is mounted on a surface of a circuit board (not shown). The second connector 2 includes a second housing 21 which is made of an insulative material, a plurality of second terminals modules 22 which are held by the second housing 21, a second shell 23 which covers around at least a part of the second housing 21, and an actuator 24 which is rotatably provided to the second shell 23.

The second housing 21 has a second mating portion 211 which is toward the up along the up-down direction D1 and a plurality of terminal receiving grooves 212 which are formed penetratingly up and down along the up-down direction D1 and extend to the second mating portion 211.

Each second terminal module 22 has a terminal holding base 221 and a plurality of second terminals 222 which are held by the terminal holding base 221. The plurality of second terminals 222 extend along the up-down direction D1, the plurality of second terminals 222 includes two second signal terminals 222*a* which are used to mate with the corresponding two first signal terminals 122*a* of the first connector 1 (see FIG. 5) and two second grounding terminals 222*b* which used to mate with the corresponding first grounding terminal 122*b* of the first connector 1 (see FIG. 5). The two second signal terminals 222*a* are arranged side by side left and right and face the front-rear direction D2, the two second grounding terminals 222*b* face each other and are respectively positioned at a left side and a right side of the two second signal terminals 222*a*. For example, the plurality of second terminals 222 are embedded to the terminal holding base 221 by insert molding. Each second signal terminal 222*a* has a second contact portion 222*c* which is constructed to an arc-shaped edge of a top portion of the second signal terminal 222*a* and extends upwardly and forwardly and a second connecting portion 222*d* which is positioned at a bottom portion of the second signal terminal 222*a*, each second grounding terminal 222*b* has a second contact portion 222*e* which extends upwardly in the up-down direction D1 and a second connecting portion 222*f* which is positioned at a bottom portion of the second grounding terminal 222*b*.

The plurality of second terminals modules 22 are respectively provided in the plurality of terminal receiving grooves 212 of the second housing 21, the second contact portions 222*c*, 222*e* of the plurality of second terminals 222 together with a local part of the corresponding terminal holding base 221 are exposed to the second mating portion 211 via an opening at a top portion of the corresponding terminal receiving groove 212, and the second connecting portions 222*d* of the second signal terminals 222*a* and the second connecting portions 222*f* of the second grounding terminals 222*b* of the plurality of second terminals 222 pass through an opening at a bottom portion of the corresponding terminal receiving groove 212 and are connected to the circuit board, for example, the second connecting portions 222*d* of the second signal terminals 222*a* and the second connecting portions 222*f* of the second grounding terminals 222*b* of the plurality of second terminals 222 may be connected with the circuit board by surface welding.

The second shell 23 is made of for example a metal plate. The second shell 23 has two second side portions 231 which cover a left side and a right side of the second housing 21 in the left-right direction D3 respectively.

The actuator 24 is substantially cover-shaped and is rotatably provided to top portions of front ends of the two second side portions 231 of the second shell 23. The actuator 24 for example is formed by bending a metal plate. The actuator 24 has two pivoting structures 241 which are respectively pivoted to top portions of front ends of the two second side portions 231 of the second shell 23, a cover body 242 which is connected between the two pivoting structures 241, a restoring structure 243 which extends from a front end of the cover body 242 and is used to push the first connector 1 to restore, and two locking arms 244 which extend from a left side edge and a right side edge of the cover body 242 respectively and are used to engage with and be locked to the two second side portions 231 of the second shell 23 respectively. Each the pivoting structure 241 has a cam portion 241*a* which is used to push the first connector 1, the two second side portions 231 and the two pivoting structures 241 for example may be respectively pivoted therebetween by two pivoting nails 25 which extend along the left-right direction D3. The restoring structure 243 of the actuator 24 is folded rearwardly from the cover body 242 and extends rearwardly, and the restoring structure 243 corresponds to a pushed structure 14 of the first connector 1 which is positioned at a front end of the first connector 1 and extends along the left-right direction D3, the pushed structure 14 for example is constructed by the first housing 11.

The actuator 24 is capable of rotating between a non-actuating position (see FIG. 1) and an actuating position (see FIG. 13) relative to the second shell 23. When the actuator 24 is in the non-actuating position, the cover body 242 of the actuator 24 does not cover the second mating portion 211 of the second housing 21 so that the second connector 2 is in an opened state, in the present embodiment, at this time, an angle between the cover body 242 of the actuator 24 and the second mating portion 211 is 90 degrees; when the actuator 24 is in the actuating position, the cover body 242 of the actuator 24 covers the second mating portion 211 of the second housing 21 so that the second connector 2 is in a closed state. Each locking arm 244 has a locking aperture 244*a*, each second side portion 231 of the second shell 23 has a locking elastic arm 231*a*, the locking elastic arm 231*a* has a locking protrusion 231*b* which protrudes inwardly and corresponds to the locking aperture 244*a*, when the actuator 24 rotates from the non-actuating position to the actuating position, the locking aperture 244*a* of the locking arm 244 engages with the locking protrusion 231*b* of the locking elastic arm 231*a* of the second side portion 231 so that the actuator 24 is locked to the second shell 23 and is held in the actuating position.

Referring to FIG. 1 and FIG. 2, in the present embodiment, the first connector 1 further has two locking hook portions 15 which are positioned at the front end of the first connector 1, are spaced apart from each other and are arranged side by side along the left-right direction D3 and two locking protruding portions 16 which are positioned at a rear end of the first connector 1 and are positioned at a left side and a right side of the first connector 1. The two locking hook portions 15 fold downwardly and rearwardly and extend, the two locking protruding portions 16 protrude outwardly and rearwardly. For example, the two locking hook portions 15 may be constituted together by the first housing 11 and the first shell 13, the two locking protruding portions 16 also may be constituted together by the first housing 11 and the first shell 13. The second connector 2 has two locking blocks 26 and two locking recessed grooves 27 which are positioned at a front end of the second connector 2 and correspond to the two locking hook portions 15 respectively and two locking holes 28 which are positioned at a rear end of the second connector 2 and correspond to the two locking protruding portions 16 respectively. The two locking blocks 26 are respectively adjacent to the two locking recessed grooves 27 and are respectively positioned above the two locking recessed grooves 27, and the two locking blocks 26 protrude forwardly relative to the two locking recessed grooves 27 respectively, the two locking holes 28 are opened outwardly and rearwardly. For example, the two locking blocks 26 and locking recessed groove 27 may be constructed by the second housing 21, the two locking holes 28 may be constructed by the two second side portions 231 of the second shell 23 respectively.

Hereinafter a mating process of the first connector 1 and the second connector 2 is described.

Referring to FIG. 1, FIG. 2, FIG. 11 and FIG. 12, firstly, the actuator 24 of the second connector 2 is in the non-actuating position, at this time the first connector 1 and the second connector 2 are capable of firstly moving toward each other along the up-down direction D1 so that the first mating portion 111*a* of the first connector 1 and the second mating portion 211 of the second connector 2 are adjacent to each other and abut against each other in the up-down direction D1.

Figure 5:
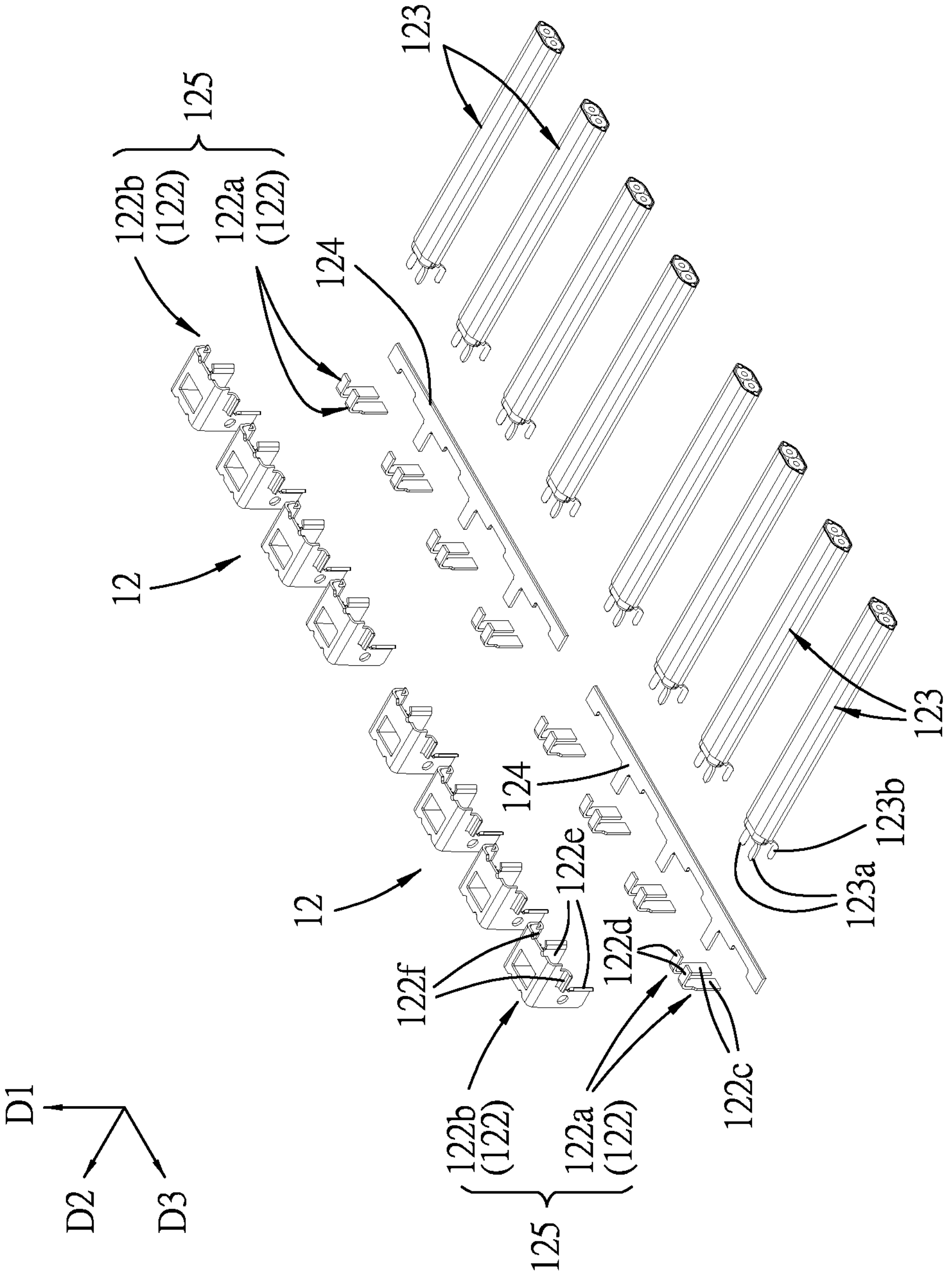
FIG. 5 is a further exploded perspective view of the first terminal module of the first connector of the embodiment.
Figure 9:
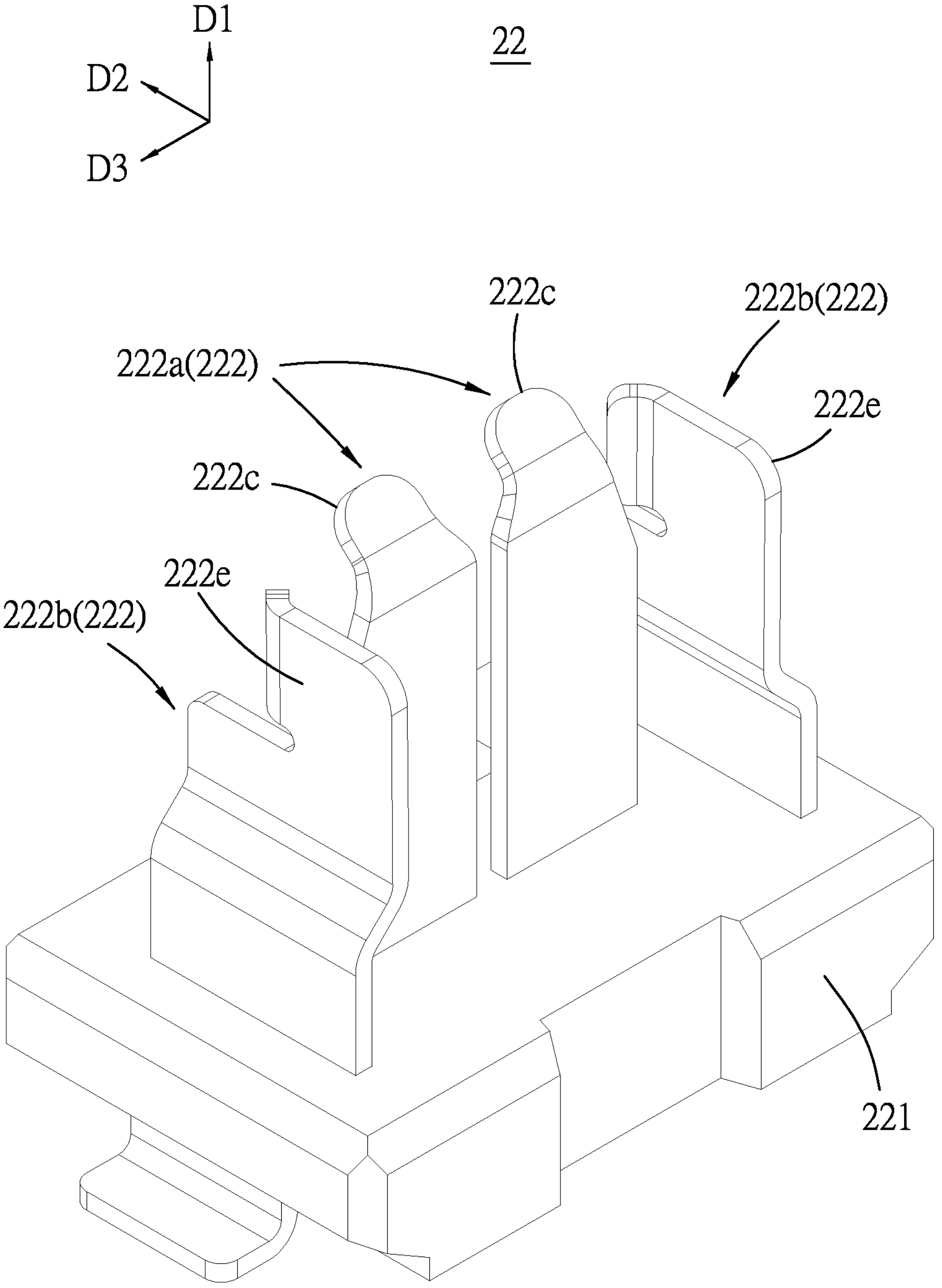
FIG. 9 is a perspective view of a second terminal module of the second connector of the embodiment.
Figure 10:
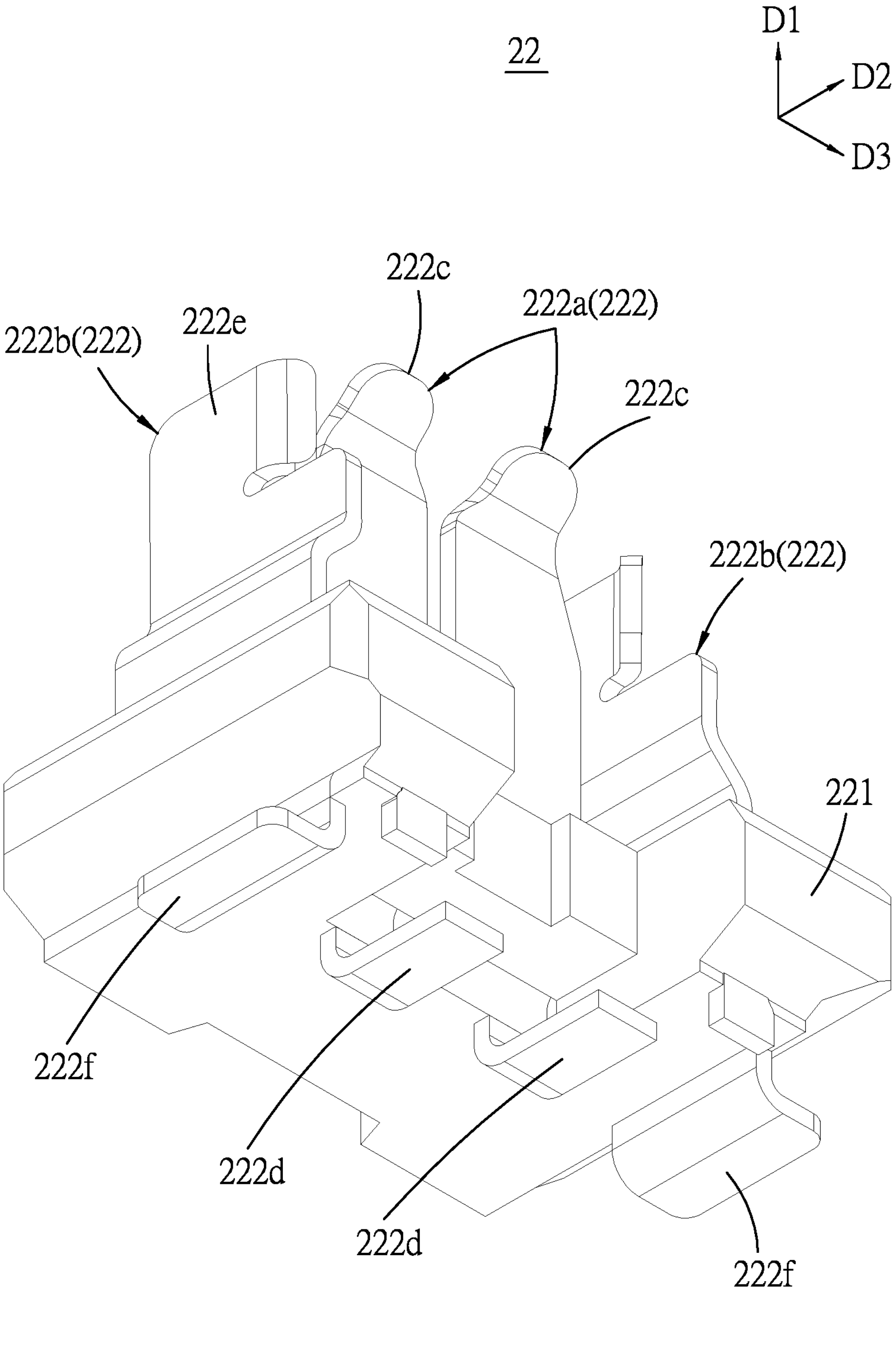
FIG. 10 is another perspective view of the second terminal module of the second connector of the embodiment of FIG. 9 viewed from another angle.
Figure 18:
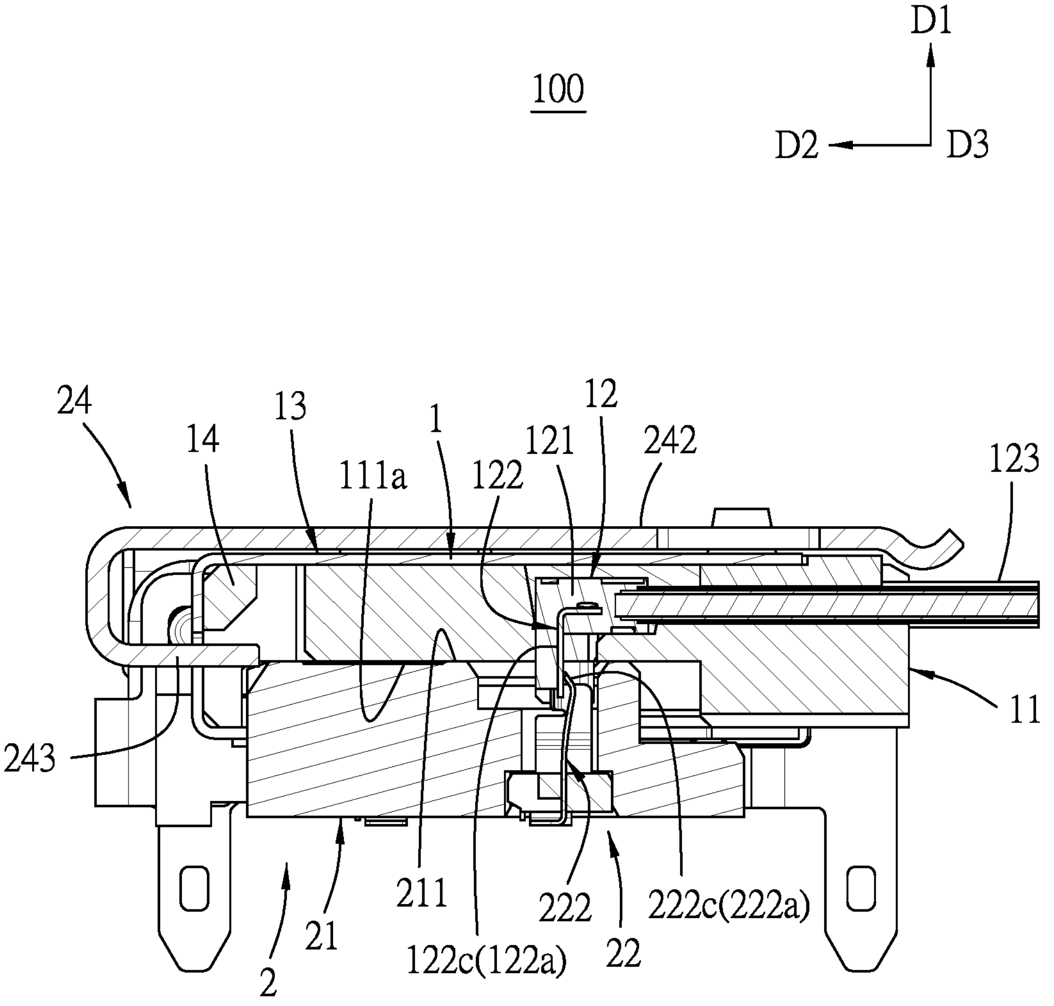
FIG. 18 is a cross sectional view of the embodiment, in which the first connector and the second connector of the embodiment mate with each other and the actuator of the second connector of the embodiment is in the actuating position.

Referring to FIG. 13 to FIG. 17, next, when the actuator 24 is rotated from the non-actuating position to the actuating position, the cam portion 241*a* of the pivoting structure 241 of the actuator 24 will push the first connector 1 rearwardly in the front-rear direction D2 to make the first connector 1 move rearwardly relative to the second connector 2 and in turn make the first contact portions 122*c*, 122*e* (see FIG. 5) of the first terminals 122 contact the second contact portions 222*c*, 222*e* (see FIG. 9) of the second terminals 222 respectively and make the first connector 1 and the second connector 2 mate with each other. Referring to FIG. 5, FIG. 9 and FIG. 18, the second contact portion 222*c* (at the arc-shaped edge) of the second signal terminal 222*a* of the second terminal 222 points forwardly obliquely and abuts against a surface of the first contact portion 122*c* of the first signal terminal 122*a* of the first terminal 122, such a contacting manner can increase a contact pressure between the second contact portion 222*c* and the surface of the first contact portion 122*c*, and, a contact area between the second contact portion 222*c* which is constructed to the arc-shaped edge of the second signal terminal 222*a* and the surface of the first contact portion 122*c* of the first signal terminal 122*a* is more stable in size, which can avoid a problem that a contact area with respect to a straight line shaped edge structure is not stable in size (a line-shaped contact region between terminals is prone to be converted into a point-shaped contact region due to rotating of the terminal(s)).

Figure 13:
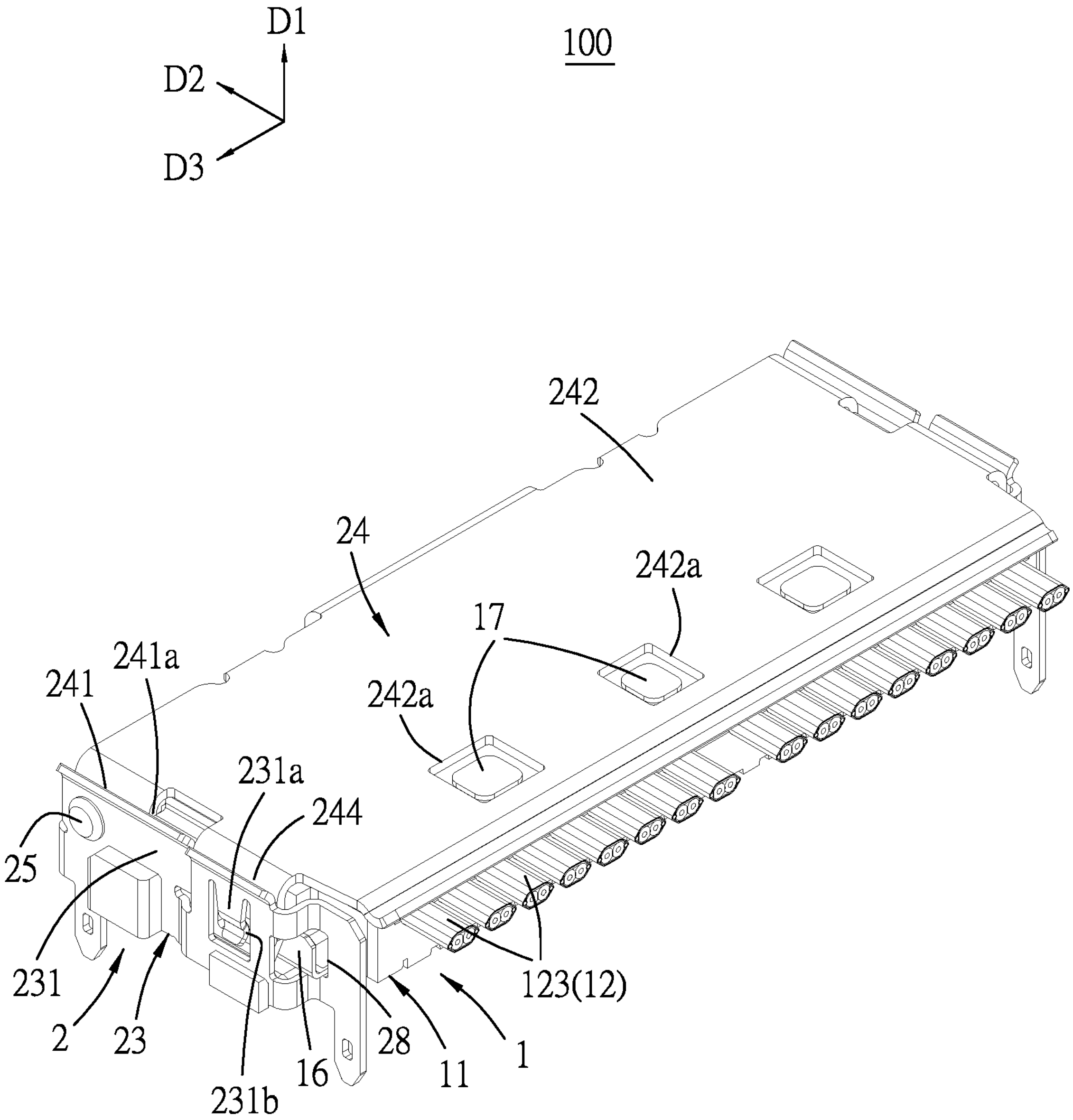
FIG. 13 is a perspective view of the embodiment, in which the first connector and the second connector of the embodiment have mated with each other.
Figure 14:
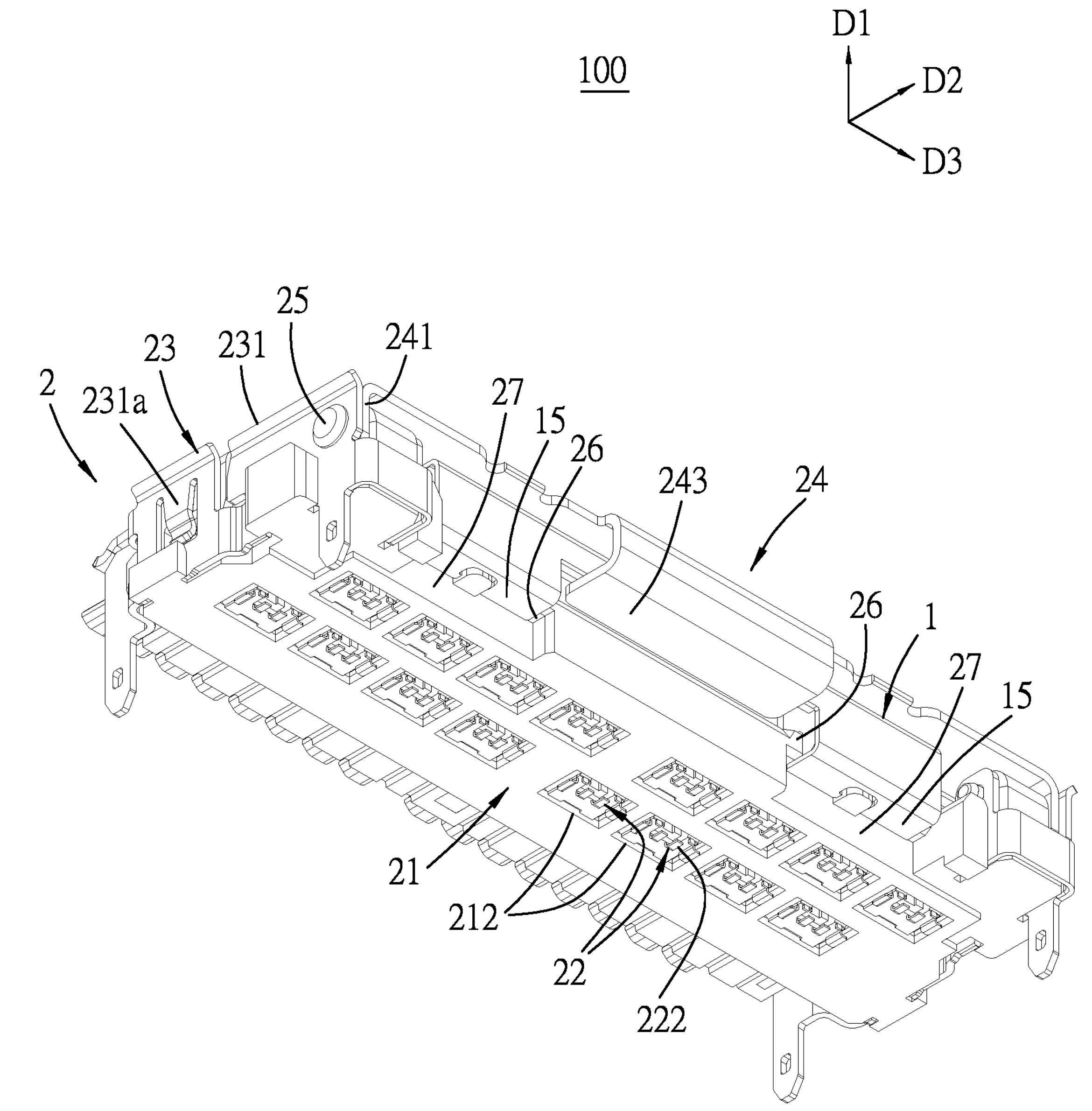
FIG. 14 is another perspective view of the embodiment of FIG. 13, in which the first connector and the second connector of the embodiment have mated with each other.
Figure 15:
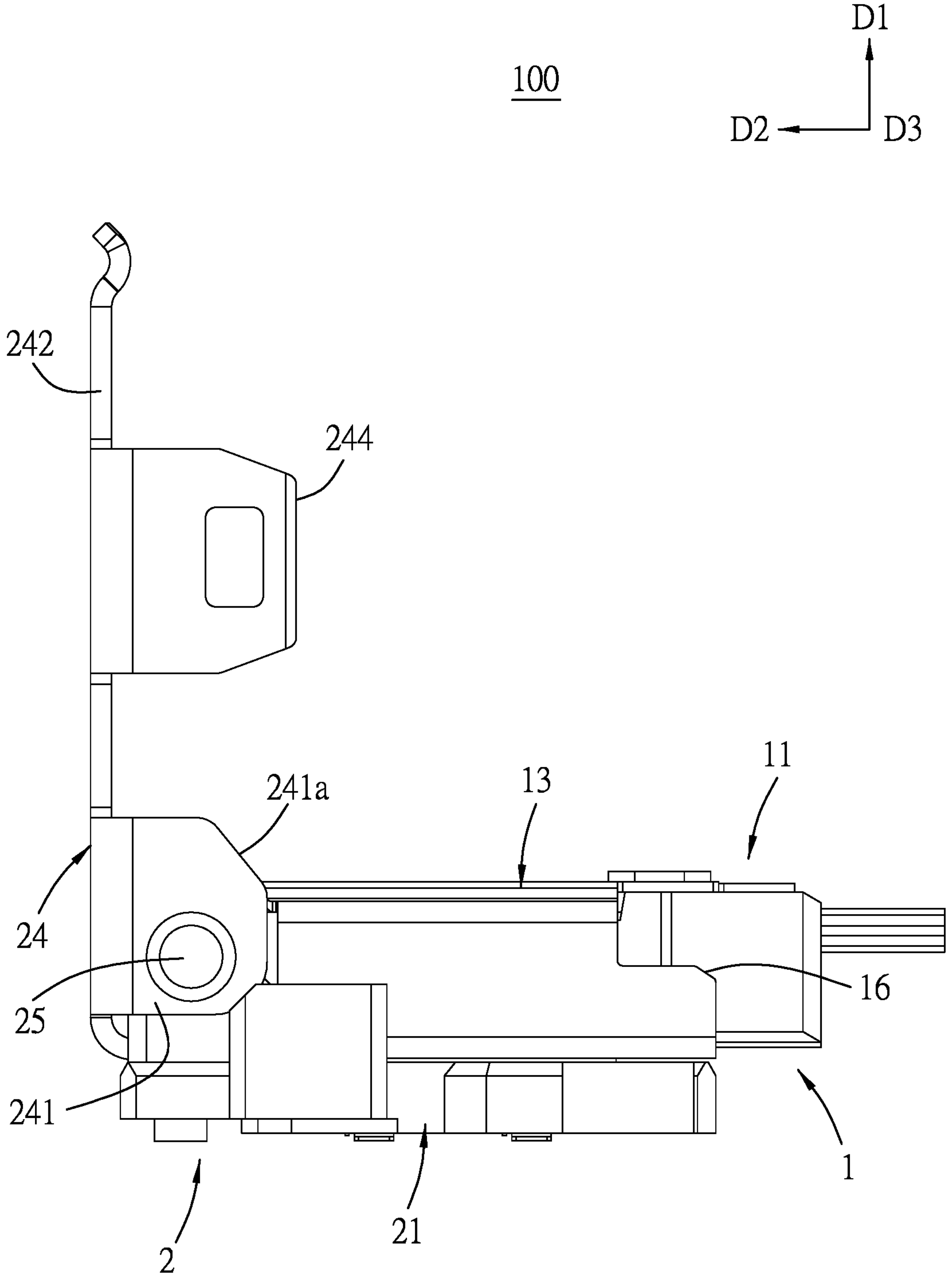
FIG. 15 is a side view of the embodiment with a second side plate of a second shell of omitted, in which the first connector and the second connector of the embodiment do not mate with each other and approach each other along the up-down direction and an actuator of the second connector of the embodiment is in a non-actuating position.
Figure 16:
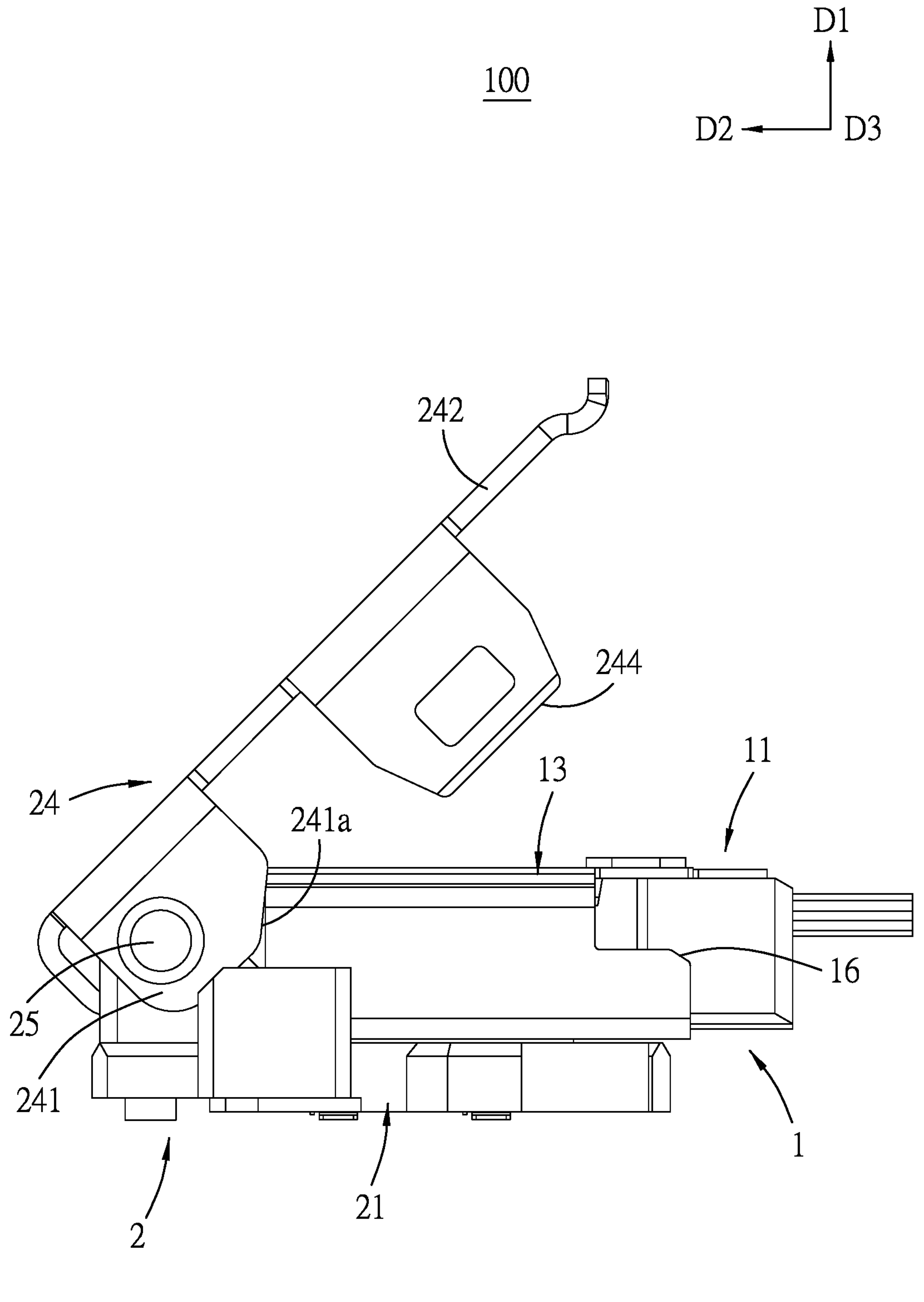
FIG. 16 is a side view of the embodiment with the second side plate of the second shell omitted, in which the actuator of the second connector of the embodiment rotates to a position between the non-actuating position and an actuating position, a cam portion of the actuator of the second connector of the embodiment rearwardly pushes the first connector along a front-rear direction, but the first connector and the second connector of the embodiment do not mate with each other.
Figure 17:
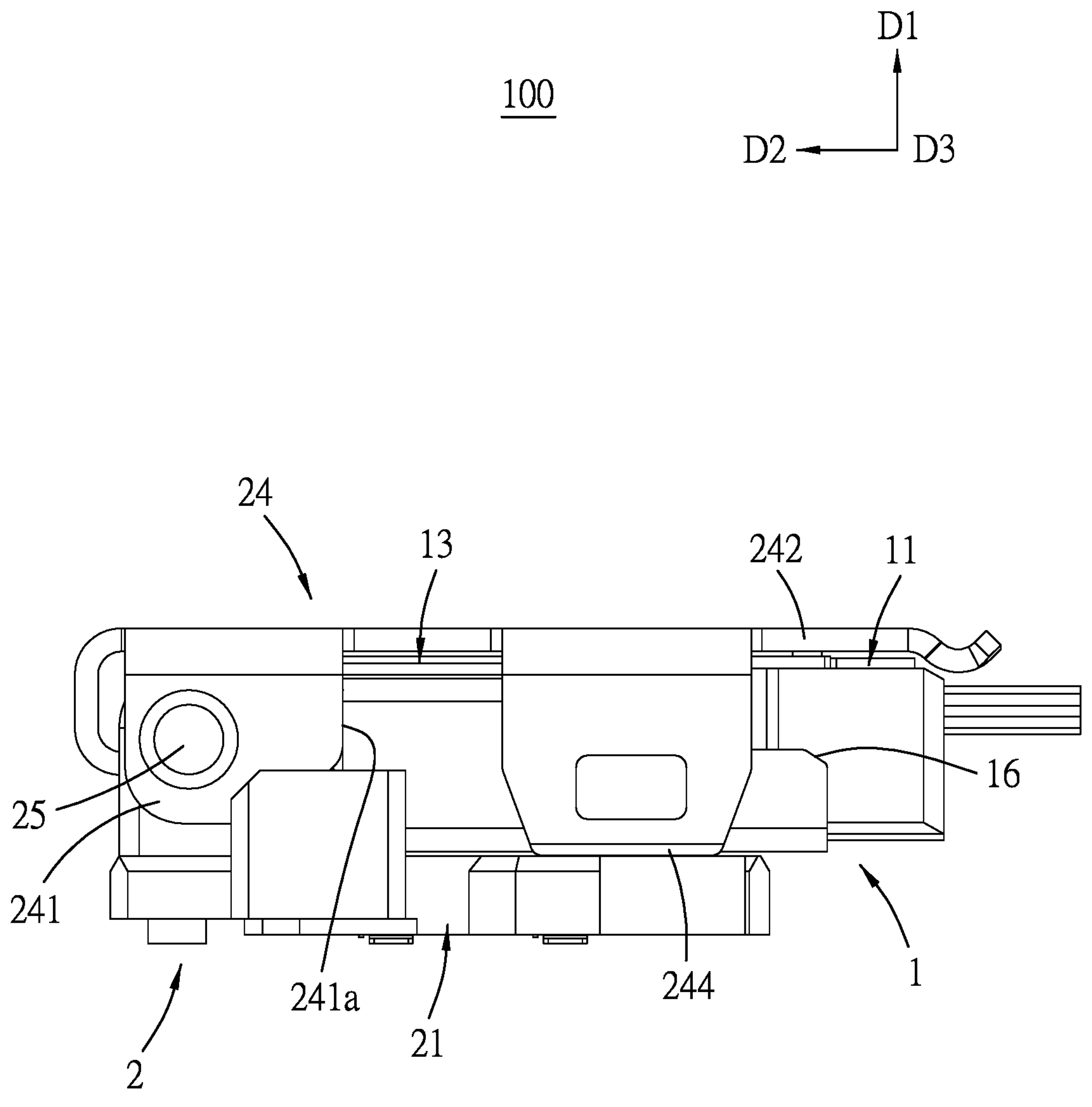
FIG. 17 is a side view of the embodiment with the second side plate of the second shell omitted, in which the actuator of the second connector of the embodiment rotates to the actuating position, the cam portion of the actuator of the second connector of the embodiment continuously rearwardly pushes the first connector along the front-rear direction to make the first connector and the second connector of the embodiment mate with each other.

Referring to FIG. 13 to FIG. 14, in addition, at this time, the locking hook portion 15 of the first connector 1 rearwardly hooks to the locking block 26 of the second connector 2 along the front-rear direction D2, and a tail end of the locking hook portion 15 of the first connector 1 rearwardly inserts into the locking recessed groove 27 of the second connector 2 along the front-rear direction D2. And the locking protruding portion 16 of the first connector 1 rearwardly snaps into the locking hole 28 of the second connector 2 along the front-rear direction D2. By the cooperation between the locking hook portion 15 and the locking block 26 and the locking recessed groove 27 and the cooperation between the locking protruding portion 16 and the locking hole 28, an effect that the first connector 1 and the second connector 2 can be further locked after the first connector 1 and the second connector 2 mate with each other.

Moreover, at this time, the cover body 242 of the actuator 24 covers the top portion 132 of the first shell 13 of the first connector 1 (see FIG. 1), furthermore, in the present embodiment, the first connector 1 further has a plurality of positioning blocks 17 which are formed to the first housing 11, pass through the first shell 13 and protrude upwardly, the positioning block 17 for example may be formed by hot melting after the first housing 11 and the first shell 13 are assembled with each other, the cover body 242 of the actuator 24 has a plurality of positioning holes 242*a* which respectively correspond to the plurality of positioning blocks 17. While the actuator 24 rotates to the actuating position, the plurality of positioning holes 242*a* of the cover body 242 of the actuator 24 respectively receive the plurality of positioning blocks 17 of the first connector 1.

In the above mating process of the first connector 1 and the second connector 2, because only in a latter half of the mating process can the first terminal 122 of the first connector 1 and the second terminal 222 of the second connector 2 contact each other, so in a former half of the mating process, a contact force between the first terminal 122 of the first connector 1 and the second terminal 222 of the second connector 2 is zero. Therefore, the first terminal 122 of the first connector 1 and the second terminal 222 of the second connector 2 can be avoided being damaged due to an improper force applied by a person in the former half of the mating process.

Figure 19:
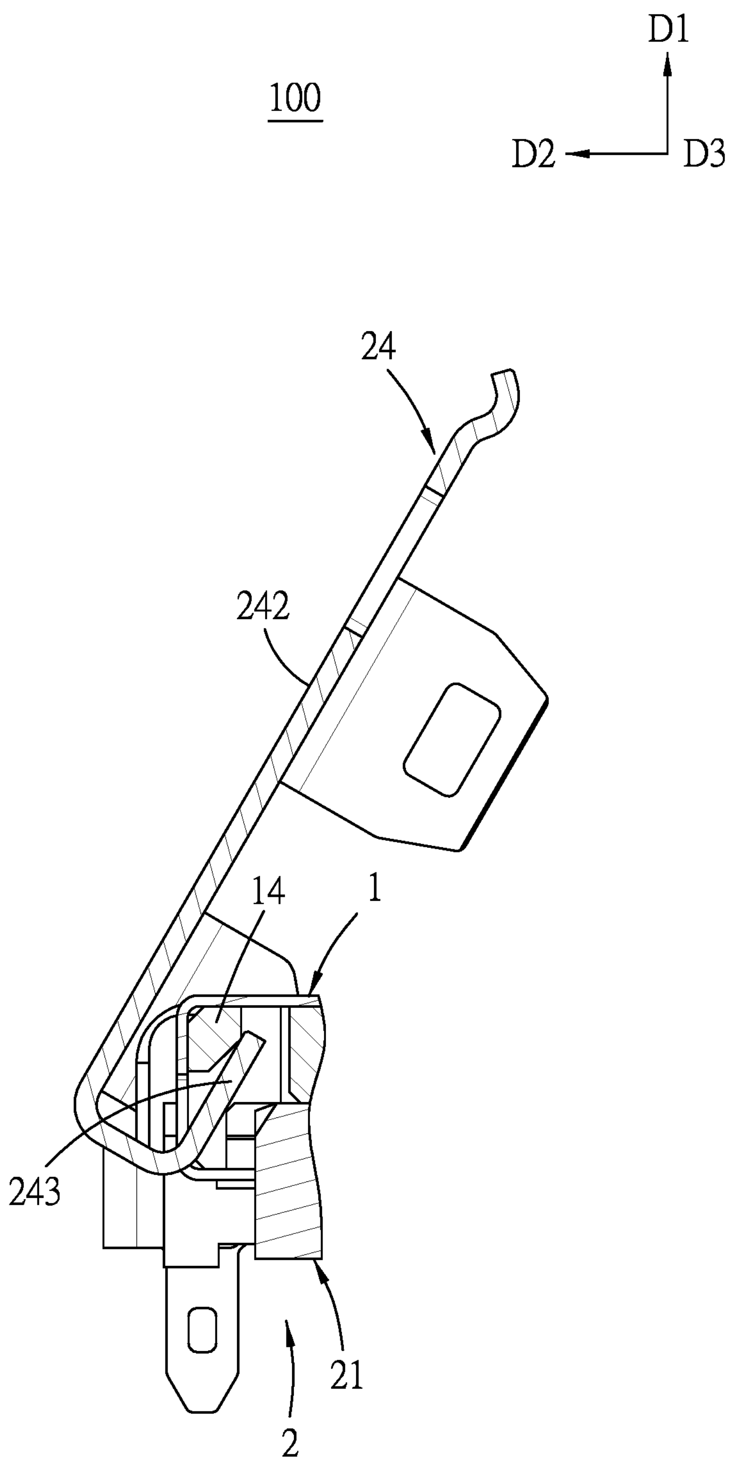
FIG. 19 is a partial cross sectional view of the embodiment, in which the actuator of the second connector of the embodiment rotates to a position between the non-actuating position and the actuating position, a restoring structure of the actuator of the second connector of the embodiment forwardly pushes the first connector.
Figure 20:
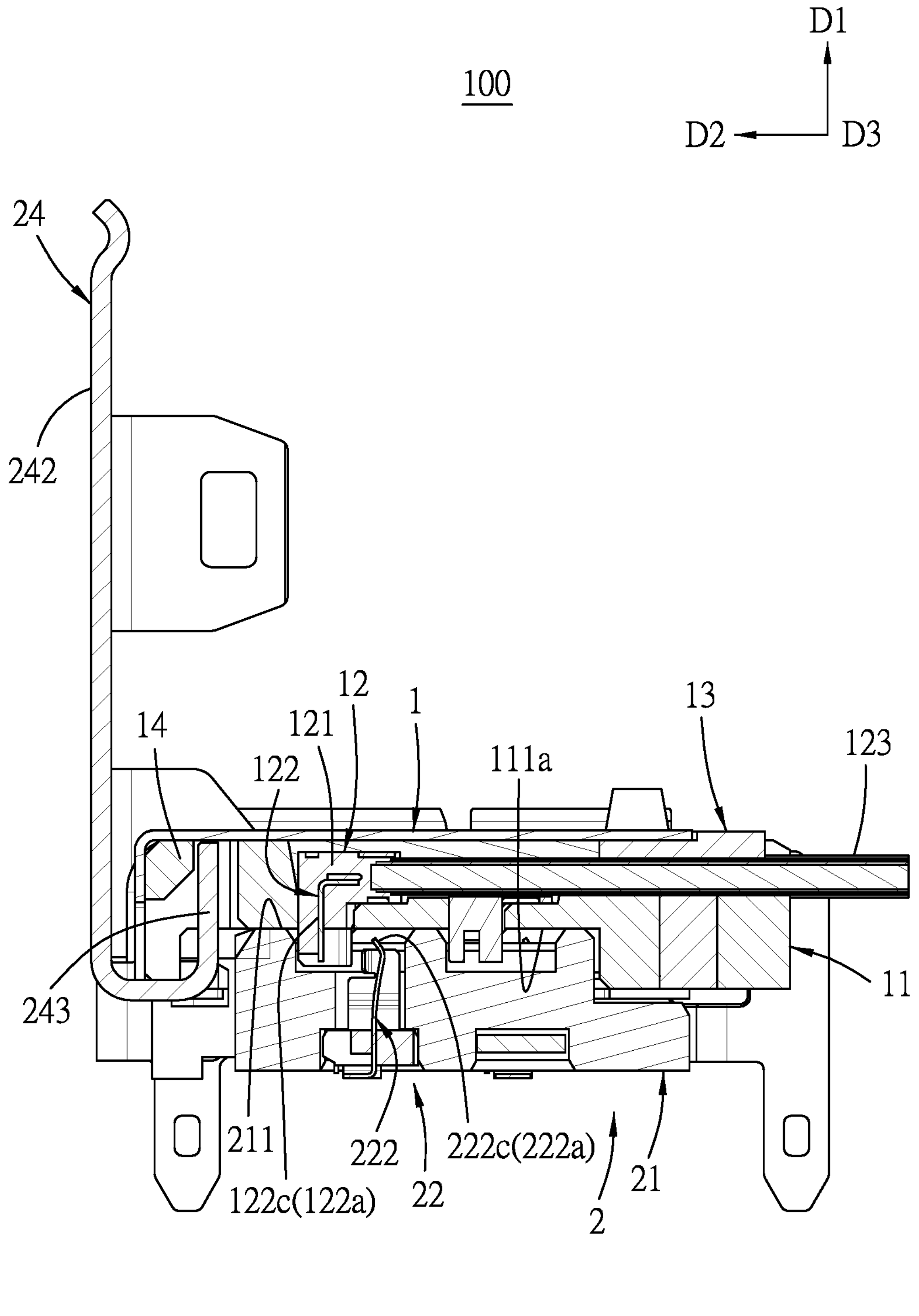
FIG. 20 is a cross sectional view of the embodiment, in which the actuator of the second connector of the embodiment rotates to the non-actuating position, the restoring structure of the actuator of the second connector of the embodiment forwardly pushes the first connector along the front-rear direction to make the mating of the first connector and the second connector of the embodiment released and make the first connector and the second connector of the embodiment return to the state as shown in FIG. 11 and FIG. 15.

Referring to FIG. 18 to FIG. 20, when the mating needs be released, the actuator 24 is rotated from the actuating position to the non-actuating position, the restoring structure 243 of the actuator 24 forwardly hooks and pushes the pushed structure 14 of the first connector 1 in the front-rear direction D2 to push the first connector 1 forwardly, in turn to make the contacting between the first contact portions 122*c*, 122*e* of the first terminals 122 (see FIG. 5) and the second contact portions 222*c*, 222*e* of the second terminals 222 (see FIG. 9) released and make the mating of the first connector 1 and the second connector 2 released.

Figure 11:
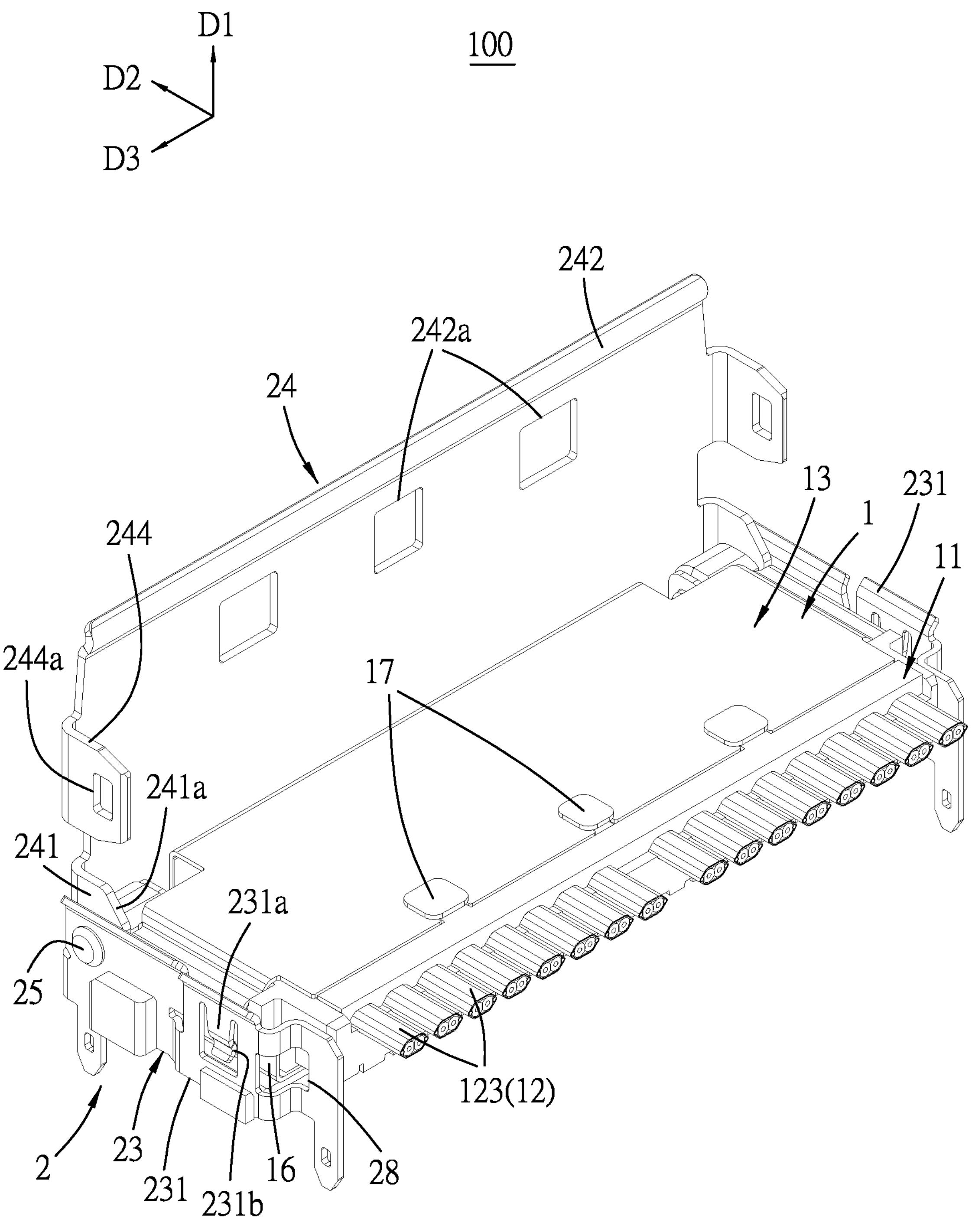
FIG. 11 is a perspective view of the embodiment, in which the first connector and the second connector of the embodiment do not mate with each other and approach each other along the up-down direction.
Figure 12:
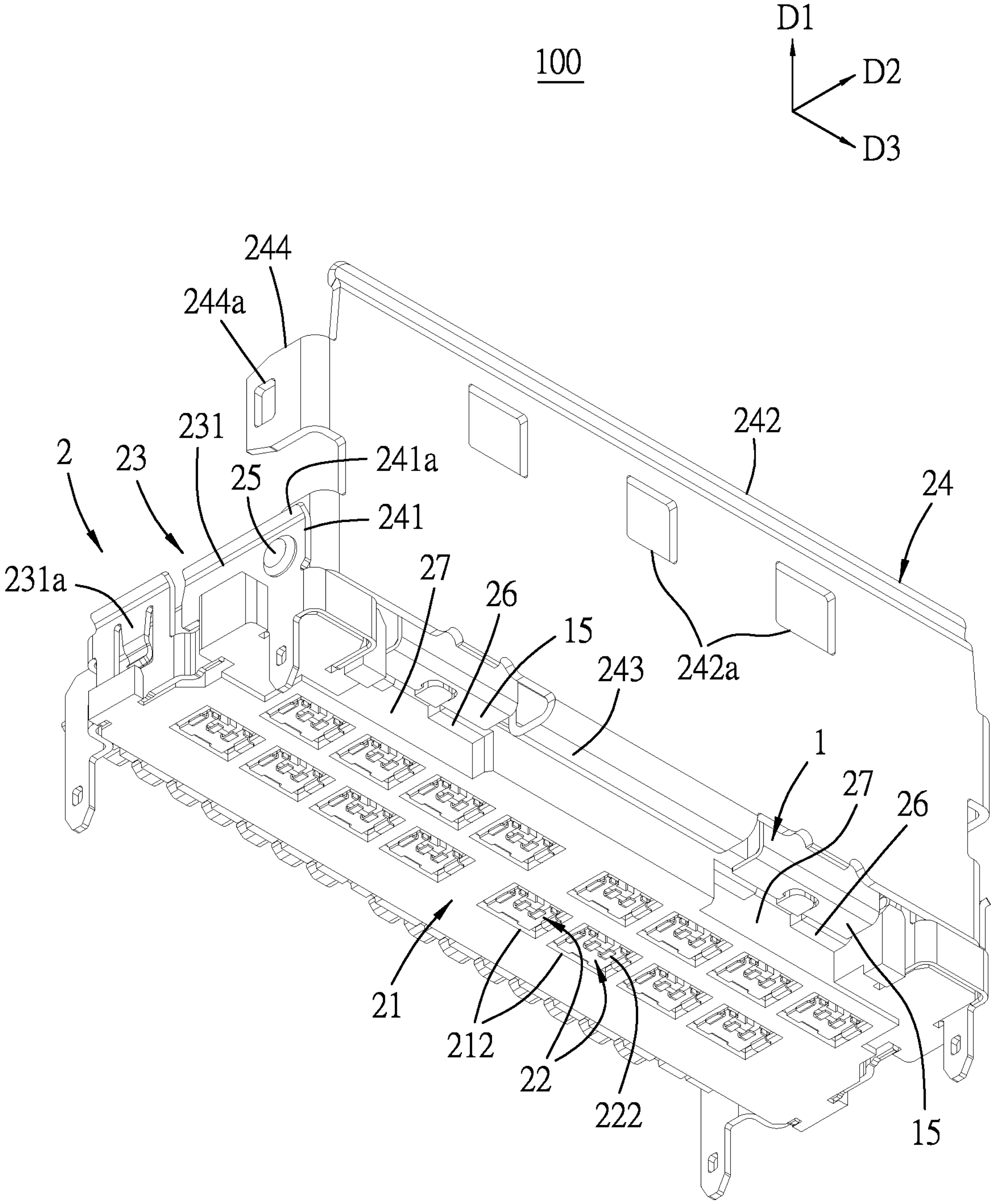
FIG. 12 is another perspective view of the embodiment of FIG. 11, in which the first connector and the second connector of the embodiment do not mate with each other and approach each other along the up-down direction.

Referring to FIG. 11 and FIG. 12, at this time, the locking hook portion 15 of the first connector 1 is forwardly detached from the locking block 26 of the second connector 2 along the front-rear direction D2, and the tail end of the locking hook portion 15 of the first connector 1 is forwardly withdrawn from the locking recessed groove 27 of the second connector 2 along the front-rear direction D2. And the locking protruding portion 16 of the first connector 1 is forwardly detached from the locking hole 28 of the second connector 2 along the front-rear direction D2, so, after the mating is released, the first connector 1 and the second connector 2 may be separated from each other along the up-down direction D1.

In conclusion, the mating process between the first connector 1 and the second connector 2 of the connector assembly 100 of the present disclosure may be divided into the former half and the latter half, in the former half, the first connector 1 and the second connector 2 move toward each other along the up-down direction D1 (the first direction); in the latter half, the first connector 1 and the second connector 2 move relative to each other along the front-rear direction D2 (the second direction). Because only in the latter half of the mating process can the first terminal 122 of the first connector 1 and the second terminal 222 of the second connector 2 contact each other, so in the former half of the mating process, a contact force between the first terminal 122 of the first connector 1 and the second terminal 222 of the second connector 2 is zero. In addition, the cam portion 241*a* of the actuator 24 can push the first connector 1 rearwardly in the front-rear direction D2 (the second direction) to make the first connector 1 and the second connector 2 mate with each other, the restoring structure 243 of the actuator 24 can push the first connector 1 forwardly in the front-rear direction D2 (the second direction) to make the mating between the first connector 1 and the second connector 2 released, the locking arm 244 of the actuator 24 can make the actuator 24 held to the actuating position. Moreover, the second contact portion 222*c* of the second signal terminal 222*a* of the second terminal 222 of the second connector 2 is constructed to the arc-shaped edge of the second signal terminal 222*a* and is used to abut against the surface of the first contact portion 122*c* of the first signal terminal 122*a* of the first terminal 122, such a contacting manner can increase a contact pressure between the second contact portion 222*c* and the surface of the first contact portion 122*c*, and, a contact area between the second contact portion 222*c* which is constructed to the arc-shaped edge of the second signal terminal 222*a* and the surface of the first contact portion 122*c* of the first signal terminal 122*a* is more stable in size, which can avoid a problem that a contact area with respect to a straight line shaped edge structure is not stable in size (a line-shaped contact region between terminals is prone to be converted into a point-shaped contact region due to rotating of the terminal(s)). Moreover, a stress on the cable 123 can be relieved by the covering structure 112 which is provided to the cable receiving space 111*c* of the first body 111 and only covers the local part of the cable 123, by the cooperation between the locking hook portion 15 and the locking block 26 and the locking recessed groove 27 and the cooperation between the locking protruding portion 16 and the locking hole 28, an effect that the first connector 1 and the second connector 2 can be locked after the first connector 1 and the second connector 2 mate with each other.

However, what is described above is just the embodiments of the present disclosure, which is not intended to limit the scope implementing the present disclosure, any simple equivalent variations and modifications made according to the claims and the specification of the present disclosure will also be fallen within the scope of the present disclosure.

What is claimed is:

1. A connector assembly, comprising:

a first connector comprising a first housing and a first terminal held by the first housing, the first terminal having a first contact portion which extends in a first direction; and a second connector comprising a second housing, a second terminal held by the second housing, a second shell around at least a part of the second housing, and an actuator which is rotatably provided to the second shell, the second terminal extending in the first direction and having a second contact portion, wherein the actuator is capable of rotating between a non-actuating position and an actuating position relative to the second shell, and in a mating process of the first connector and the second connector, the first connector and the second connector first move toward each other along the first direction when the actuator is in the non-actuating position, then the actuator pushes the first connector along a second direction perpendicular to the first direction to make the first contact portion of the first terminal contact the second contact portion of the second terminal and make the first connector and the second connector mate with each other when the actuator rotates from the non-actuating position to the actuating position.

2. The connector assembly of claim 1, wherein the first connector further comprises a cable held by the first housing, the first terminal further comprises a first connecting portion connected to the cable, and the second connector is mounted on a surface of a circuit board.

3. The connector assembly of claim 2, wherein the second terminal further comprises a second connecting portion which is connected to the circuit board.

4. The connector assembly of claim 1, wherein the first connector comprises a plurality of first terminals, the plurality of first terminals comprise a first signal terminal, the second connector comprises a plurality of second terminals, the plurality of second terminals comprise a second signal terminal which is used to mate with the first signal terminal, and when the first connector mates with the second connector, a second contact portion of the second signal terminal abuts against a surface of a first contact portion of the first signal terminal.

5. The connector assembly of claim 4, wherein the second contact portion of the second signal terminal is constructed to an edge of the second signal terminal, and when the first connector mates with the second connector, the second contact portion of the second signal terminal points to the first contact portion of the first signal terminal.

6. The connector assembly of claim 5, wherein the second contact portion of the second signal terminal is constructed to an arc-shaped edge of the second signal terminal.

7. The connector assembly of claim 4, wherein the plurality of first terminals further comprises a first grounding terminal, and the plurality of second terminals further comprises a second grounding terminal which is used to mate with the first grounding terminal.

8. The connector assembly of claim 7, wherein the first connector further comprises a cable and a grounding piece which are held by the first housing, the cable comprises a signal wire and a ground wire, the signal wire is connected to the first signal terminal, and the grounding piece is connected between a first grounding terminal among the first plurality of terminals and the ground wire of the cable.

9. The connector assembly of claim 7, wherein the first grounding terminal is formed by bending a conductive metal plate and is a U-shaped construction.

10. The connector assembly of claim 1, wherein the first connector further comprises a cable which is held by the first housing, the first housing comprises a first body and a covering structure, the first body comprises a terminal receiving space and a cable receiving space, the first terminal and a local part of the cable are provided to the terminal receiving space, a local part of the cable is provided to the cable receiving space, and the covering structure is provided to the cable receiving space of the first body by overmolding.

11. The connector assembly of claim 1, wherein the first connector further comprises a cable which is held by the first housing, the first housing comprises a first body and a full covering structure, the first body comprises a terminal receiving space and a cable receiving space, the first terminal and a local part of the cable are provided to the terminal receiving space, a local part of the cable is provided to the cable receiving space, and the full covering structure is provided to the terminal receiving space and the cable receiving space of the first body by overmolding.

12. The connector assembly of claim 1, wherein the first connector further comprises a first shell which covers around at least a part of the first housing.

13. The connector assembly of claim 12, wherein the first shell comprises two first side portions which respectively cover two sides of the first housing in a third direction perpendicular to the first direction and the second direction and a top portion which is connected between the two first side portions, the second shell comprises two second side portions which respectively cover two sides of the second housing in the third direction, and the actuator is rotatably provided to the two second side portions of the second shell.

14. The connector assembly of claim 12, wherein the actuator comprises a pivoting structure which is pivoted to the second shell, the pivoting structure comprises a cam portion, and when the actuator rotates from the non-actuating position to the actuating position, the cam portion of the actuator pushes the first connector in the second direction to make the first contact portion of the first terminal contact the second contact portion of the second terminal and make the first connector and the second connector mate with each other.

15. The connector assembly of claim 12, wherein the actuator comprises a restoring structure, and when the actuator rotates from the actuating position to the non-actuating position, the restoring structure of the actuator pushes the first connector in the second direction to release the contact between the first contact portion of the first terminal and the second contact portion of the second terminal and to release the mate of the first connector and the second connector.

16. The connector assembly of claim 12, wherein the actuator comprises a locking arm, and when the actuator rotates from the non-actuating position to the actuating position, the locking arm engages with and is locked to the second shell.

17. The connector assembly of claim 1, wherein the first connector comprises a locking hook portion, the second connector comprises a locking block and a locking recessed groove which are adjacent to each other, and when the first connector and the second connector move relative to each other along the second direction and mate with each other, the locking hook portion hooks to the locking block along the second direction, and a tail end of the locking hook portion inserts into the locking recessed groove along the second direction.

18. The connector assembly of claim 1, wherein the first connector comprises a locking protruding portion, the second connector comprises a locking hole, and when the first connector and the second connector move relative to each other along the second direction and mate with each other, the locking protruding portion snaps into the locking hole along the second direction.

19. A connector assembly, comprising:

a first connector comprising a first housing and a first terminal held by the first housing; and a second connector comprising a second housing, a second terminal held by the second housing, a second shell around at least a part of the second housing, and an actuator which is rotatably provided to the second shell, wherein in a mating process of the first connector and the second connector, the first housing and the second housing first move toward each other along the first direction when the actuator is in a non-actuating position, then the actuator pushes the first connector along a second direction perpendicular to the first direction relative to each other to make the first terminal contact the second terminal when the actuator rotates from the non-actuating position to an actuating position.

20. The connector assembly of claim 19, wherein the first connector further comprises a cable held by the first housing, the first terminal further comprises a first connecting portion connected to the cable, and the second connector is mounted on a surface of a circuit board.

* * * * *